United States Patent
Farley et al.

(10) Patent No.: US 6,932,592 B2
(45) Date of Patent: *Aug. 23, 2005

(54) METALLOCENE-PRODUCED VERY LOW DENSITY POLYETHYLENES

(75) Inventors: James M. Farley, League City, TX (US); Richard W. Halle, Houston, TX (US); George Panagopoulos, Cypress, TX (US); Jerry M. Johnson, League City, TX (US); Douglas J. Laurent, Appleton, WI (US); Alan M. Malakoff, Houston, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 10/311,114

(22) PCT Filed: Jun. 22, 2001

(86) PCT No.: PCT/US01/20076

§ 371 (c)(1),
(2), (4) Date: Dec. 13, 2002

(87) PCT Pub. No.: WO01/98372

PCT Pub. Date: Dec. 27, 2001

(65) Prior Publication Data

US 2003/0213938 A1 Nov. 20, 2003

Related U.S. Application Data

(60) Provisional application No. 60/213,571, filed on Jun. 22, 2000, provisional application No. 60/243,208, filed on Oct. 25, 2000, provisional application No. 60/270,802, filed on Feb. 23, 2001, provisional application No. 60/278,560, filed on Mar. 23, 2001, provisional application No. 60/278,315, filed on Mar. 23, 2001, and provisional application No. 60/278,567, filed on Mar. 23, 2001.

(51) Int. Cl.$^7$ .............................................. B23B 27/32
(52) U.S. Cl. ...................... 425/523; 428/512; 428/461; 525/240; 526/349; 526/943
(58) Field of Search ................................ 428/512, 461, 428/523; 525/240; 526/348, 943

(56) References Cited

U.S. PATENT DOCUMENTS

| | | | | |
|---|---|---|---|---|
| 5,272,236 | A | | 12/1993 | Lai et al. .................. 526/348.5 |
| 5,278,272 | A | | 1/1994 | Lai et al. .................. 526/348.5 |
| 5,976,682 | A | * | 11/1999 | Eichbauer .................... 428/213 |
| 6,271,323 | B1 | * | 8/2001 | Loveday et al. ............. 526/161 |
| 6,608,149 | B2 | * | 8/2003 | Mawson et al. ............... 526/60 |
| 6,620,757 | B2 | * | 9/2003 | McConville et al. ....... 502/104 |
| RE38,429 | E | * | 2/2004 | Eichbauer .................... 428/352 |
| 2003/0213938 | A1 | * | 11/2003 | Farley et al. ................ 252/500 |
| 2003/0215659 | A1 | * | 11/2003 | Farley et al. ................ 428/500 |

FOREIGN PATENT DOCUMENTS

| | | | |
|---|---|---|---|
| WO | WO9608521 | 3/1996 | ......... C08F/210/00 |
| WO | WO9929737 | 6/1999 | ........... C08F/4/642 |

* cited by examiner

Primary Examiner—D. Lawrence Tarazano

(57) ABSTRACT

A very low density polyethylene having a density of 0.890 to 0.915 and a Dart Drop value of at least about 450 g/mil or above is disclosed. Gas phase polymerization methods are also disclosed for making very low density linear polyolefins utilizing a metallocene catalyst, and the resulting polyolefin products. In a specific embodiment, a gas phase polymerization process is disclosed relating to the formation of a linear polyethylene having a very low density, e.g., ranging from 0.890 to 0.915, but with improved toughness.

53 Claims, No Drawings

US 6,932,592 B2

METALLOCENE-PRODUCED VERY LOW DENSITY POLYETHYLENES

This application claims the benefit of U.S. Provisional Application No. 60/213,571, filed Jun. 22, 2000; U.S. Provisional Application No. 60/243,208, filed Oct. 25, 2000; U.S. Provisional Application No. 60/270,802, filed Feb. 23, 2001; U.S. Provisional Application No. 60/278,560, filed Mar. 23, 2001; U.S. Provisional Application No. 60/278,315, filed Mar. 23, 2001; and U.S. Provisional Application No. 60/278,567 filed Mar. 23, 2001, the entire disclosures of which are hereby incorporated by reference.

FIELD OF THE INVENTION

The inventions disclosed herein relate to gas phase polymerization methods for making very low density linear polyolefins, utilizing a metallocene catalyst. Preferably, the inventions relate to processes for making very low density polyethylene (VLDPE) having improved toughness and a density ranging from the lower limits of 0.890 g/cm$^3$, 0.900 g/cm$^3$, 0.905 g/cm$^3$, 0.910 g/cm$^3$ or 0.911 g/cm$^3$ to the upper limits of 0.915 g/cm$^3$ or 0.913 g/cm$^3$.

BACKGROUND

Various types of polyethylenes are known in the art. Low density polyethylene ("LDPE") can be prepared at high pressure using free radical initiators, or in gas phase processes using Ziegler-Natta or vanadium catalysts, and typically has a density in the range of 0.916–0.940 g/cm$^3$. LDPE is also known as "branched" or "heterogeneously branched" polyethylene because of the relatively large number of long chain branches extending from the main polymer backbone. Polyethylene in the same density range, i.e., 0.916 to 0.940 g/cm$^3$, which is linear and does not contain long chain branching is also known; this "linear low density polyethylene" ("LLDPE") can be produced with conventional Ziegler-Natta catalysts or with metallocene catalysts. Relatively higher density LDPE, typically in the range of 0.928 to 0.940 g/cm$^3$, is sometimes referred to as medium density polyethylene ("MDPE"). Polyethylenes having still greater density are the high density polyethylenes ("HDPEs"), i.e., polyethylenes having densities greater than 0.940 g/cm$^3$, and are generally prepared with Ziegler-Natta catalysts. Very low density polyethylene ("VLDPE") is also known. VLDPEs can be produced by a number of different processes yielding polymers with different properties, but can be generally described as polyethylenes having a density less than 0.916 g/cm$^3$, typically 0.890 to 0.915 g/cm$^3$ or 0.900 to 0.915 g/cm$^3$.

U.S. Pat. Nos. 5,272,236 and 5,278,272 disclose polyethylenes termed "substantially linear ethylene polymers" ("SLEPs"). These SLEPs are characterized as having a polymer backbone substituted with about 0.01 long chain branches/1000 carbons to about 3 long chain branches/1000 carbons, more preferably from about 0.01 long chain branches/1000 carbons to about 1 long chain branches/1000 carbons, and especially from about 0.05 long chain branches/1000 carbons to about 1 long chain branches/1000 carbons. As used herein and in U.S. Pat. Nos. 5,272,236 and 5,278,272, a polymer with "long chain branching" is defined as one having a chain length of at least about 6 carbons, above which the length cannot be distinguished using $^{13}$C NMR spectroscopy. It is further disclosed that the long chain branch can be as long as about the same length as the length of the polymer backbone. As used in the present disclosure, the term "linear" is applied to a polymer that has a linear backbone and does not have long chain branching; i.e., a "linear" polymer is one that does not have the long chain branches characteristic of an SLEP polymer.

There exists a need for an improved VLDPE with good toughness and sealability properties.

SUMMARY OF INVENTION

In general, the present invention is directed to very low density polyethylene (VLDPE) polymer having a density of less than 0.916 g/cm$^3$, and films formed therefrom. The VLDPE polymer can be produced in a metallocene-catalyzed process, preferably a gas-phase metallocene-catalyzed process. The mVLDPE polymers of the present invention are characterized by a unique set of properties, including one or more of the following: (a) a composition distribution CDBI of 50 to 85%, alternatively 60 to 80%, or 55 to 75%, or 55% or more to 70% or less; (b) a molecular weight distribution Mw/Mn of 2 to 3, alternatively 2.2 to 2.8; (c) a molecular weight distribution Mz/Mw of less than 2; and (d) the presence of two peaks in a TREF measurement.

In one embodiment, the present invention is directed to a metallocene-produced VLDPE polymer, the VLDPE being an ethylene copolymer with a comonomer content of 25% or less by weight, preferably 20% or less by weight, and more preferably 15% or less by weight.

In one embodiment, the present invention is directed to a metallocene-produced VLDPE polymer, preferably a gas-phase metallocene-produced VLDPE polymer, the VLDPE polymer being a copolymer of ethylene and at least one $C_3$ to $C_{12}$ alpha olefin and having a density of from 0.890 to 0.915 g/cm$^3$ and a melt index of from 0.1 to 20 g/10 min.

In another embodiment, the present invention is directed to a gas-phase metallocene-produced VLDPE polymer, the VLDPE polymer being a copolymer of ethylene and 1-butene, 1-hexene, 4-methyl-1-pentene, or 1-octene and having a density from the lower limits of 0.890 g/cm$^3$, 0.900 g/cm$^3$, 0.905 g/cm$^3$, 0.910 g/cm$^3$ or 0.911 g/cm$^3$ to the upper limits of 0.915 g/cm$^3$ or 0.913 g/cm$^3$, a melt index of from 0.5 to 20 g/10 min, a composition distribution breadth index of 60 to 80 wt %, and a molecular weight distribution (Mw/Mn) of 2.2 to 2.8.

In another embodiment, the present invention is directed to blown or cast monolayer films formed from a mVLDPE polymer of the invention.

In another embodiment, the present invention is directed to blown or cast multilayer films, wherein at least one layer of the multilayer film is formed of a mVLDPE polymer of the invention.

In other embodiments, the invention is directed to articles including the films of the invention, articles wrapped with the films of the invention, and substrates coated with the films of the invention.

It has been surprisingly found that monolayer or multilayer films formed of or including at least one layer of the mVLDPE polymers of the present invention exhibit improved toughness relative to films using conventional VLDPEs of similar density. In particular, the inventive films have a Dart Drop value of at least 450 g/mil, alternatively at least 490 g/mil, at least 600 g/mil, at least 1,000 g/mil, or at least 1,200 g/mil. The inventive films also have other superior toughness properties, such as improved puncture resistance.

In another embodiment, mVLDPE films described herein also have superior hot tack strength at low initiation temperatures. Hot tack strength generally reflects the strength of a heat seal formed immediately after a sealing operation, before the film cools. For example, the polymer may be part of a heat seal layer in a multi-layer film, or part of a VLDPE film used in a product that requires heat sealing of at least two films during manufacture, such as in food packaging.

In another aspect, the present invention also relates to gas phase polymerization methods utilizing a metallocene catalyst, for making metallocene-catalyzed very low density polyethylenes, such as those described herein. In another aspect, the present invention relates to polyethylenes made using the described methods and having improved properties, particularly toughness.

In a specific embodiment, the present invention provides a gas phase polymerization process for making an mVLDPE by passing a gaseous stream containing one or more monomers through a fluidized bed under reactive conditions in the presence of a metallocene catalyst, to form a very low density polyethylene having improved toughness, a density ranging from 0.890 to 0.915 g/cm$^3$, a melt index of 0.1 to 20 g/10 min, and one or more of the following properties: (a) a composition distribution CDBI of 50 to 85%, alternatively 60 to 80%, or 55 to 75%, or 55% or more to 70% or less; (b) a molecular weight distribution Mw/Mn of 2 to 3, alternatively 2.2 to 2.8; (c) a molecular weight distribution Mz/Mw of less than 2; and (d) the presence of two peaks in a TREF measurement. In a particular embodiment, the metallocene catalyst is supported. In another particular embodiment, the gas phase polymerization is carried out in a condensed mode of operation.

In various embodiments, the improved polymer and film properties are due to the use of a gas phase polymerization process, as contrasted with other polymerization processes, such as solution or bulk polymerization. In addition or alternatively, in various embodiments, the improved polymer and film properties are due to the use of a metallocene catalyst and specific levels of co-monomers.

These and other features and advantages of embodiments of the present invention are described in more detail below.

DETAILED DESCRIPTION

In at least one specific embodiment, the invention includes a VLDPE polymer made using a gas phase polymerization process. As used herein, the terms "very low density polyethylene" polymer and "VLDPE" polymer refer to a polyethylene polymer having a density of less than 0.916 g/cm$^3$. As used herein, the term "gas phase polymerization" refers to polymerization of polymers from monomers in a gas fluidized bed. For example, the VLDPEs of the present invention may be made by polymerizing alpha-olefins in the presence of a metallocene catalyst under reactive conditions in a gas phase reactor having a fluidized bed and a fluidizing medium. In a specific embodiment, the VLDPE polymer can be made by polymerization in a single reactor (as opposed to multiple reactors). As discussed in greater detail below, a variety of gas phase polymerization processes may be used. For example, polymerization may be conducted in uncondensed or "dry" mode, condensed mode, or "super-condensed mode." In a specific embodiment, the liquid in the fluidizing medium can be maintained at a level greater than 2 weight percent based on the total weight of the fluidizing medium.

The material exiting the reactor includes a very low density polyethylene (VLDPE), having density within the ranges described elsewhere herein, e.g., having a density from 0.890 to 0.915, more preferably a density from 0.910 to 0.915, and a stream comprising unreacted monomer gases. Following polymerization, the polymer is recovered. In certain embodiments, the stream can be compressed and cooled, and mixed with feed components, whereupon a gas phase and a liquid phase are then returned to the reactor.

In a preferred aspect, the invention VLDPEs are copolymers, made from ethylene monomers together with at least one comonomer, e.g., hexene or octene. Polymers having more than two types of monomers, such as terpolymers, are also included within the term "copolymer" as used herein. For example, VLDPE terpolymers may be made, using ethylene monomer together with any two of butene, hexene and octene. For one embodiment of the VLDPE polymer comprising an ethylene/butene copolymer, the molar ratio of butene to ethylene should be from about 0.015 to 0.035, preferably from 0.020 to 0.030. For one embodiment of the VLDPE polymer comprising an ethylene/hexene copolymer, the molar ratio of hexene to ethylene should be from about 0.015 to 0.035, preferably from 0.020 to 0.030. For one embodiment of the VLDPE polymer comprising an ethylene/octene copolymer, the molar ratio of octene to ethylene should be from about 0.015 to 0.035, preferably from 0.020 to 0.030.

The comonomers that are useful in general for making VLDPE copolymers include α-olefins, such as $C_3$–$C_{20}$ α-olefins and preferably $C_3$–$C_{12}$ α-olefins. The α-olefin comonomer can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting. Preferred comonomers include propylene, 1-butene, 1-pentene, 4-methyl-1-pentene, 1-hexene, 1-octene and styrene, more preferably 1-butene, 1-hexene, and 1-octene.

Although not generally preferred, other useful comonomers include polar vinyl, conjugated and non-conjugated dienes, acetylene and aldehyde monomers, which can be included in minor amounts in terpolymer compositions. Non-conjugated dienes useful as co-monomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2. 1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Of the non-conjugated dienes typically used, the preferred dienes are dicyclopentadiene, 1,4-hexadiene, 5-methylene-2-norbornene, 5-ethylidene-2-norbornene, and tetracyclo-(Δ-11,12)-5,8-dodecene. Particularly preferred diolefins are 5-ethylidene-2-norbornene (ENB), 1,4-hexadiene, dicyclopentadiene (DCPD), norbornadiene, and 5-vinyl-2-norbornene (VNB). Note that throughout this description the terms "non-conjugated diene" and "diene" are used interchangeably.

It should be appreciated that the amount of comonomer used will depend upon the desired density of the VLDPE polymer and the specific comonomers selected. In general, the comonomer may be present in an amount of 25% or less by weight, preferably 20% or less by weight and more preferably 15% or less by weight. In one embodiment, the comonomer may be present in an amount of 5% or more by weight. For a given comonomer, the density of the VLDPE polymer produced therefrom decreases as the comonomer content increases. One skilled in the art can readily determine the appropriate comonomer content appropriate to produce a VLDPE polymer having a desired density.

Metallocene catalysts are an important feature of this invention. For the purpose of this patent specification and the claims, a "metallocene catalyst" is defined to be at least one metallocene catalyst component containing one or more cyclopentadienyl moiety in combination with a transition metal. The active catalyst systems should include not only metallocene, but also an activator, such as an alumoxane or a derivative thereof (preferably MAO), an ionizing activator, a Lewis acid, or a combination thereof. The catalyst system is preferably supported on a carrier, typically an inorganic oxide or chloride or a resinous material such as polyethylene. Preferably, the catalyst system includes a metallocene component with single or multiple cyclopentadienyl components reacted with either a metal alkyl or alkoxy component or an ionic compound component. These catalysts can include partially and/or fully activated precursor compositions. The catalysts may be modified by prepolymerization or encapsulation. Specific metallocenes and catalyst systems useful in practicing the invention are disclosed in WO 96/11961 (International Application No. PCT/US95/12789) and WO 96/11960 (International Application No. PCT/US95/12737). Other non-limiting examples of metallocene catalysts and catalyst systems are discussed in U.S. Pat. Nos. 4,808,561, 5,017,714, 5,055,438, 5,064,802, 5,124,418, 5,153,157 and 5,324,800 all of the disclosures and teachings of which are incorporated by reference. Still other organometallic complexes and/or catalyst systems are described in Organometallics, 1999, 2046; PCT publications WO 96/23010, WO 99/14250, WO 98/50392, WO 98/41529, WO 98/40420, WO 98/40374, WO 98/47933; and European publications EP 0 881 233 and EP 0 890 581.

The terms "metallocene" and "metallocene catalyst precursor" as used herein mean compounds having a Group 4, 5 or 6 transition metal (M), with a cyclopentadienyl (Cp) ligand or ligands which may be substituted, at least one non-cyclopentadienyl-derived ligand (X), and zero or one heteroatom-containing ligand (Y), the ligands being coordinated to M and corresponding in number to the valence thereof. The metallocene catalyst precursors generally require activation with a suitable co-catalyst (referred to as an "activator"), in order to yield an "active metallocene catalyst", i.e., an organometallic complex with a vacant coordination site that can coordinate, insert, and polymerize olefins. The metallocene catalyst precursor is preferably one of, or a mixture of metallocene compounds of either or both of the following types:

(1) Cyclopentadienyl (Cp) complexes which have two Cp ring systems for ligands. The Cp ligands form a sandwich complex with the metal and can be free to rotate (unbridged) or locked into a rigid configuration through a bridging group. The Cp ring ligands can be like or unlike, unsubstituted, substituted, or a derivative thereof, such as a heterocyclic ring system which may be substituted, and the substitutions can be fused to form other saturated or unsaturated rings systems such as tetrahydroindenyl, indenyl, or fluorenyl ring systems. These cyclopentadienyl complexes have the general formula $(Cp^1R^1{}_m)R^1{}_n(Cp^2R^2{}_p)MX_q$ wherein: $Cp^1$ and $Cp^2$ are the same or different cyclopentadienyl rings; $R^1$ and $R^2$ are each, independently, a halogen or a hydrocarbyl, halocarbyl, hydrocarbyl-substituted organometalloid or halocarbyl-substituted organometalloid group containing up to about 20 carbon atoms; m is 0 to 5; p is 0 to 5; two $R^1$ and/or $R^2$ substituents on adjacent carbon atoms of the cyclopentadienyl ring associated therewith can be joined together to form a ring containing from 4 to about 20 carbon atoms; $R^3$ is a bridging group; n is the number of atoms in the direct chain between the two ligands and is 0 to 8, preferably 0 to 3; M is a transition metal having a valence of from 3 to 6, preferably from group 4, 5, or 6 of the periodic table of the elements and is preferably in its highest oxidation state; each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms; and q is equal to the valence of M minus 2.

(2) Monocyclopentadienyl complexes which have only one Cp ring system as a ligand. The Cp ligand forms a half-sandwich complex with the metal and can be free to rotate (unbridged) or locked into a rigid configuration through a bridging group to a heteroatom-containing ligand. The Cp ring ligand can be unsubstituted, substituted, or a derivative thereof such as a heterocyclic ring system which may be substituted, and the substitutions can be fused to form other saturated or unsaturated rings systems such as tetrahydroindenyl, indenyl, or fluorenyl ring systems. The heteroatom containing ligand is bound to both the metal and optionally to the Cp ligand through the bridging group. The heteroatom itself is an atom with a coordination number of three from Group 15 or a coordination number of two from group 16 of the periodic table of the elements. These mono-cyclopentadienyl complexes have the general formula $(Cp^1R^1{}_m)R^3{}_n(YR^2)MX_s$ wherein: each $R^1$ is independently, a halogen or a hydrocarbyl, halocarbyl, hydrocarbyl-substituted organometalloid or halocarbyl-substituted organometalloid group containing up to about 20 carbon atoms, "m" is 0 to 5, and two $R^1$ substituents on adjacent carbon atoms of the cyclopentadienyl ring associated there with can be joined together to form a ring containing from 4 to about 20 carbon atoms; $R^3$ is a bridging group; "n" is 0 to 3; M is a transition metal having a valence of from 3 to 6, preferably from group 4, 5, or 6 of the periodic table of the elements and is preferably in its highest oxidation state; Y is a heteroatom containing group in which the heteroatom is an element with a coordination number of three from Group 15 or a coordination number of two from group 16, preferably nitrogen, phosphorous, oxygen, or sulfur; $R^2$ is a radical selected from a group consisting of $C_1$ to $C_{20}$ hydrocarbon radicals, substituted $C_1$ to $C_{20}$ hydrocarbon radicals, wherein one or more hydrogen atoms is replaced with a halogen atom, and when Y is three coordinate and unbridged there may be two $R^2$ groups on Y each independently a radical selected from the group consisting of $C_1$ to $C_{20}$ hydrocarbon radicals, substituted $C_1$ to $C_{20}$ hydrocarbon radicals, wherein one or more hydrogen atoms is replaced with a halogen atom, and each X is a non-cyclopentadienyl ligand and is, independently, a hydrogen, a halogen or a hydrocarbyl, oxyhydrocarbyl, halocarbyl, hydrocarbyl-substituted organometalloid, oxyhydrocarbyl-substituted organometalloid or halocarbyl-substituted organometalloid group containing up to about 20 carbon atoms, "s" is equal to the valence of M minus 2.

Examples of biscyclopentadienyl metallocenes of the type described in group (1) above for producing the m-VLDPE polymers of the invention are disclosed in U.S. Pat. Nos. 5,324,800; 5,198,401; 5,278,119; 5,387,568; 5,120,867; 5,017,714; 4,871,705; 4,542,199; 4,752,597; 5,132,262; 5,391,629; 5,243,001; 5,278,264; 5,296,434; and 5,304,614.

Illustrative, but not limiting, examples of suitable biscyclopentadienyl metallocenes of the type described in group (1) above are the racemic isomers of:

$\mu$-$(CH_3)_2$Si(indenyl)$_2$M(Cl)$_2$;

$\mu$-$(CH_3)_2$Si(indenyl)$_2$M(CH$_3$)$_2$;

$\mu$-$(CH_3)_2$Si(tetrahydroindenyl)$_2$M(Cl)$_2$;

$\mu$-$(CH_3)_2$Si(tetrahydroindenyl)$_2$M(CH$_3$)$_2$;

$\mu$-$(CH_3)_2$Si(indenyl)$_2$M(CH$_2$CH$_3$)$_2$; and $\mu$-$(C_6H_5)_2$C(indenyl)$_2$M(CH$_3$)$_2$;

wherein M is Zr or Hf.

Examples of suitable unsymmetrical cyclopentadienyl metallocenes of the type described in group (1) above are disclosed in U.S. Pat. Nos. 4,892,851; 5,334,677; 5,416,228; and 5,449,651; and in the publication *J. Am. Chem. Soc.* 1988, 110, 6255.

Illustrative, but not limiting, examples of preferred unsymmetrical cyclopentadienyl metallocenes of the type described in group (1) above are:

$\mu$-$(C_6H_5)_2$C(cyclopentadienyl)(fluorenyl)M(R)$_2$;

$\mu$-$(C_6H_5)_2$C(3-methylcyclopentadienyl)(fluorenyl)M(R)$_2$;

$\mu$-$(CH_3)_2$C(cyclopentadienyl)(fluorenyl)M(R)$_2$;

$\mu$-$(C_6H_5)_2$C(cyclopentadienyl)(2-methylindenyl)M(CH$_3$)$_2$;

$\mu$-$(C_6H_5)_2$C(3-methylcyclopentadienyl)(2-methylindenyl)M(Cl)$_2$;

$\mu$-$(C_6H_5)_2$C(cyclopentadienyl)(2,7-dimethylfluorenyl)M(R)$_2$; and $\mu$-$(CH_3)_2$C(cyclopentadienyl)(2,7-dimethylfluorenyl)M(R)$_2$;

wherein M is Zr or Hf, and R is Cl or CH$_3$.

Examples of suitable monocyclopentadienyl metallocenes of the type described in group (2) above are disclosed in U.S. Pat. Nos. 5,026,798; 5,057,475; 5,350,723; 5,264,405; 5,055,438; and in WO 96/002244.

Illustrative, but not limiting, examples of preferred monocyclopentadienyl metallocenes of the type described in group (2) above are:

$\mu$-$(CH_3)_2$Si(cyclopentadienyl)(1-adamantylamido)M(R)$_2$;

$\mu$-$(CH_3)_2$Si(3-tertbutylcyclopentadienyl)(1-adamantylamido)M(R)$_2$;

$\mu$-$(CH_2$(tetramethylcyclopentadienyl)(1-adamantylamido)M(R)$_2$;

$\mu$-$(CH_3)_2$Si(tetramethylcyclopentadienyl)(1-adamantylamido)M(R)$_2$;

$\mu$-$(CH_3)_2$C(tetramethylcyclopentadienyl)(1-adamantylamido)M(R)$_2$;

$\mu$-$(CH_3)_2$Si(tetramethylcyclopentadienyl)(1-teributylamido)M(R)$_2$;

$\mu$-$(CH_3)_2$Si(fluorenyl)(1-tertbutylamido)M(R)$_2$;

$\mu$-$(CH_3)_2$Si(tetramethylcyclopentadienyl)(1-cyclododecylamido)M(R)$_2$; and $\mu$-$(C_6H_5)_2$C(tetramethylcyclopentadienyl)(1-cyclododecylamido)M(R)$_2$;

wherein M is Ti, Zr or Hf, and R is Cl or CH$_3$.

Other organometallic complexes that are useful catalysts for the VLDPE polymers described herein are those with diimido ligand systems, such as are described in WO 96/23010. Other references describing suitable organometallic complexes include Organometallics, 1999, 2046; PCT publications WO 99/14250, WO 98/50392, WO 98/41529, WO 98/40420, WO 98/40374, WO 98/47933; and European publications EP 0 881 233 and EP 0 890 581.

The metallocene compounds and/or other organometallic complexes are contacted with an activator to produce an active catalyst. One class of activators is noncoordinating anions, where the term "noncoordinating anion" (NCA) means an anion which either does not coordinate to the transition metal cation or which is only weakly coordinated to the transition metal cation, thereby remaining sufficiently labile to be displaced by a neutral Lewis base. "Compatible" noncoordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Noncoordinating anions useful in accordance with this invention are those which are compatible, stabilize the metallocene cation in the sense of balancing its ionic charge in a +1 state, yet retain sufficient lability to permit displacement by an ethylenically or acetylenically unsaturated monomer during polymerization. Additionally, the anions useful in this invention will be large or bulky in the sense of sufficient molecular size to largely inhibit or prevent neutralization of the metallocene cation by Lewis bases other than the polymerizable monomers that may be present in the polymerization process. Typically the anion will have a molecular size of greater than or equal to about 4 angstroms.

An additional method of making metallocene catalysts uses ionizing anionic precursors which are initially neutral Lewis acids but form the cation and anion upon ionizing reaction with the metallocene compounds. For example, tris(pentafluorophenyl) boron acts to abstract an alkyl, hydride or silyl ligand from the metallocene compound to yield a metallocene cation and a stabilizing noncoordinating anion; see, EP-A-0 427 697 and EP-A-0 520 732. Metallocene catalysts for addition polymerization can also be prepared by oxidation of the metal centers of transition metal compounds by anionic precursors containing metallic oxidizing groups along with the anion groups; see EP-A-0 495 375.

Examples of suitable activators capable of ionic cationization of the metallocene compounds of the invention, and consequent stabilization with a resulting noncoordinating anion, include:

trialkyl-substituted ammonium salts such as:
triethylammonium tetraphenylborate;
tripropylammonium tetraphenylborate;
tri(n-butyl)ammonium tetraphenylborate;
trimethylammonium tetrakis(p-tolyl)borate;
trimethylammonium tetrakis(o-tolyl)borate;
tributylammonium tetrakis(pentafluorophenyl)borate;
tripropylammonium tetrakis(o,p-dimethylphenyl)borate;
tributylammonium tetrakis(m,m-dimethylphenyl)borate;
tributylammonium tetrakis(p-trifluoromethylphenyl) borate;
tributylammonium tetrakis(pentafluorophenyl)borate; and
tri(n-butyl)ammonium tetrakis(o-tolyl)borate;
N,N-dialkyl anilinium salts such as:
N,N-dimethylanilinium tetrakis(pentafluorophenyl) borate;
N,N-dimethylaniliniumtetrakis(heptafluoronaphthyl) borate;
N,N-dimethylanilinium tetrakis(perfluoro-4-biphenyl) borate;
N,N-dimethylanilinium tetraphenylborate;
N,N-diethylanilinium tetraphenylborate; and
N,N-2,4,6-pentamethylanilinium tetraphenylborate;
dialkyl ammonium salts such as:
di-(isopropyl)ammonium tetrakis(pentafluorophenyl) borate; and
dicyclohexylammonium tetraphenylborate; and
triaryl phosphonium salts such as:
triphenylphosphonium tetraphenylborate;
tri(methylphenyl)phosphonium tetraphenylborate; and
tri(dimethylphenyl)phosphonium tetraphenylborate.

Further examples of suitable anionic precursors include those including a stable carbonium ion, and a compatible non-coordinating anion. These include:
tropillium tetrakis(pentafluorophenyl)borate;
triphenylmethylium tetrakis(pentafluorophenyl)borate;
benzene (diazonium) tetrakis(pentafluorophenyl)borate;
tropillium phenyltris(pentafluorophenyl)borate;
triphenylmethylium phenyl-(trispentafluorophenyl) borate;
benzene (diazonium) phenyl-tris(pentafluorophenyl) borate;
tropillium tetrakis(2,3,5,6-tetrafluorophenyl)borate;
triphenylmethylium tetrakis(2,3,5,6-tetrafluorophenyl) borate;
benzene (diazonium) tetrakis(3,4,5-trifluorophenyl) borate;
tropillium tetrakis(3,4,5-trifluorophenyl)borate;
benzene (diazonium) tetrakis(3,4,5-trifluorophenyl) borate;
tropillium tetrakis(3,4,5-trifluorophenyl)aluminate;
triphenylmethylium tetrakis(3,4,5-trifluorophenyl) aluminate;
benzene (diazonium) tetrakis(3,4,5-trifluorophenyl) aluminate;
tropillinum tetrakis(1,2,2-trifluoroethenyl)borate;
triphenylmethylium tetrakis(1,2,2-trifluoroethenyl) borate;
benzene (diazonium) tetrakis(1,2,2-trifluoroethenyl) borate;
tropillium tetrakis(2,3,4,5-tetrafluorophenyl)borate;
triphenylmethylium tetrakis(2,3,4,5-tetrafluorophenyl) borate; and
benzene (diazonium) tetrakis(2,3,4,5-tetrafluorophenyl) borate.

Where the metal ligands include halide moieties, for example, (methyl-phenyl) silylene(tetra-methyl-cyclopentadienyl)(tert-butyl-amido) zirconium dichloride), which are not capable of ionizing abstraction under standard conditions, they can be converted via known alkylation reactions with organometallic compounds such as lithium or aluminum hydrides or alkyls, alkylalumoxanes, Grignard reagents, etc. See EP-A-0 500 944, EP-A1-0 570 982 and EP-A1-0 612 768 for processes describing the reaction of alkyl aluminum compounds with dihalide substituted metallocene compounds prior to or with the addition of activating anionic compounds. For example, an aluminum alkyl compound may be mixed with the metallocene prior to its introduction into the reaction vessel. Since the alkyl aluminum is also suitable as a scavenger (as described below), its use in excess of that normally stoichiometrically required for akylation of the metallocene will permit its addition to the reaction solvent with the metallocene compound. Normally, alumoxane would not be added with the metallocene, so as to avoid premature activation, but can be added directly to the reaction vessel in the presence of the polymerizable monomers when serving as both scavenger and alkylating activator.

Alkylalumoxanes are additionally suitable as catalyst activators, particularly for those metallocenes having halide ligands. An alumoxane useful as a catalyst activator typically is an oligomeric aluminum compound represented by the general formula $(R-Al-O)_n$, which is a cyclic compound, or $R(R-Al-O)_nAlR_2$, which is a linear compound. In these formulae, each R or $R_2$ is a $C_1$ to $C_5$ alkyl radical, for example, methyl, ethyl, propyl, butyl or pentyl, and "n" is an integer from 1 to about 50. Most preferably, R is methyl and "n" is at least 4, i.e., methylalumoxane (MAO). Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

Optionally, a scavenging compound is also used. The term "scavenging compound" as used herein refers to those compounds effective for removing polar impurities from the reaction solvent. Such impurities can be inadvertently introduced with any of the polymerization reaction components, particularly with solvent, monomer and comonomer feed, and adversely affect catalyst activity and stability by decreasing or even eliminating catalytic activity, particularly when a metallocene cation-noncoordinating anion pair is the catalyst system. The polar impurities, or catalyst poisons, include water, oxygen, oxygenated hydrocarbons, metal impurities, etc. Preferably, steps are taken before provision of such into the reaction vessel, for example, by chemical treatment or careful separation techniques after or during the synthesis or preparation of the various components, but some minor amounts of scavenging compound will still normally be required in the polymerization process itself. Typically, the scavenging compound will be an organometallic compound such as the Group-13 organometallic compounds of U.S. Pat. Nos. 5,153,157 and 5,241,025; EP-A-0 426 638; WO-A-91/09882; WO-A-94/03506; and WO-A-93/14132. Exemplary compounds include triethyl aluminum, triethyl borane, tri-isobutyl aluminum, isobutyl aluminumoxane, those having bulky substituents covalently bound to the metal or metalloid center being preferred to minimize adverse interaction with the active catalyst.

The material exiting the reactor includes the VLDPE polymer and a stream containing unreacted monomer gases. Following polymerization, the polymer is recovered. In certain embodiments, the stream can be compressed and cooled, and mixed with feed components, whereupon a gas phase and a liquid phase are then returned to the reactor.

Generally, in carrying out the gas phase polymerization processes described herein, the reactor temperature can be in the range of about 50° C. to about 110° C., sometimes higher. However, the reactor temperature should not exceed the melting point of the VLDPE being formed. An illustrative reactor temperature is about 80° C. The reactor pressure should be 100 to 1000 psig, preferably about 150 to 600 psig, more preferably 200 to about 500 psig and most preferably between 250 to 400 psig.

Preferably, the process is operated in a continuous cycle. A specific, non-limiting embodiment of the gas phase polymerization process that is operated in a continuous cycle will now be described, it being understood that other forms of gas polymerization may also be used.

A gaseous stream containing one or more monomers is continuously passed through the fluidized bed under reactive conditions in the presence of a metallocene catalyst. This gaseous stream is withdrawn from the fluidized bed and recycled back into the reactor. Simultaneously, polymer product may be withdrawn from the reactor and new monomer or monomers are added to replace the reacted monomer(s). In one part of the cycle, in a reactor, a cycling gas stream is heated by the heat of polymerization. This heat is removed in another part of the cycle by a cooling system external to the reactor. Heat generated by the reaction may be removed in order to maintain the temperature of the gaseous stream inside the reactor at a temperature below the polymer and catalyst degradation temperatures. Further, it is often desirable to prevent agglomeration or formation of chunks of polymer that cannot be removed as product. This may be accomplished in a variety of art-recognized ways, e.g., through control of the temperature of the gaseous stream in the reaction bed to a temperature below the fusion or sticking temperature of the polymer particles produced during the polymerization reaction.

Heat should be removed, since the amount of polymer produced in the fluidized bed polymerization process is generally related to the amount of heat that can be withdrawn from a reaction zone in a fluidized bed within the reactor. During the gas phase polymerization process, heat can be removed from the gaseous recycle stream by cooling the stream outside the reactor. The velocity of the gaseous recycle stream in a fluidized bed process should be sufficient to maintain the fluidized bed in a fluidized state. In certain conventional fluidized bed reactors, the amount of fluid circulated to remove the heat of polymerization is often greater than the amount of fluid required for support of the fluidized bed and for adequate mixing of the solids in the fluidized bed. However, to prevent excessive entrainment of solids in a gaseous stream withdrawn from the fluidized bed, the velocity of the gaseous stream should be regulated.

The recycle stream can be cooled to a temperature below the dew point, resulting in condensing a portion of the recycle stream, as described in U.S. Pat. No. 4,543,399 and U.S. Pat. No. 4,588,790, the disclosures of which are incorporated herein by reference to the extent not inconsistent with the present inventions. As set forth in those patents, the resulting stream containing entrained liquid should be returned to the reactor without the aforementioned agglomeration and/or plugging that may occur when a liquid is introduced during the fluidized bed polymerization process. For purposes of this patent, this intentional introduction of a liquid into a recycle stream or reactor during the process is referred to generally as a "condensed mode" operation of the gas phase polymerization process. As taught by the above mentioned patents, when a recycle stream temperature is lowered to a point below its dew point in "condensed mode" operation, an increase in polymer production is possible, as compared to production in a "non-condensing" or "dry" mode because of increased cooling capacity. Also, a substantial increase in space time yield, the amount of polymer production in a given reactor volume, can be achieved by operating in "condensed mode" with little or no change in product properties. Also, in certain "condensed mode" operations, the liquid phase of the two-phase gas/liquid recycle stream mixture remains entrained or suspended in the gas phase of the mixture. The cooling of the recycle stream to produce this two-phase mixture results in a liquid/vapor equilibrium. Vaporization of the liquid occurs when heat is added or pressure is reduced. The increase in space time yields are the result of this increased cooling capacity of the recycle stream which, in turn, is due both to the greater temperature differential between the entering recycle stream and the fluidized bed temperature and to the vaporization of condensed liquid entrained in the recycle stream. In a specific non-limiting embodiment of the process described herein for making VLDPEs with improved toughness, a "condensed mode" of operation is utilized.

In operating the gas phase polymerization process to obtain the VLDPEs of this invention, the amount of polymer and catalyst, the operating temperature of the reactor, the ratio of comonomer(s) to monomer and the ratio of hydrogen to monomer should be determined in advance, so that the desired density and melt index can be achieved.

Although a variety of gas polymerization processes may be used to make the polyolefins of the present inventions, including "non-condensed" or "dry" mode, it is preferred to use any one of a variety of "condensed mode" processes, including the condensed mode processes described in the above patents, as well as improved "condensed mode" gas polymerization processes, such as those disclosed in Griffin et al., U.S. Pat. No. 5,462,999, and U.S. Pat. No. 5,405,922, which are hereby incorporated by reference, to the extent not inconsistent with the processes disclosed herein. Other types of condensed mode processes are also applicable, including so-called "supercondensed mode" processes, as discussed in U.S. Pat. Nos. 5,352,749 and 5,436,304, both of which are fully incorporated by reference, to the extent not inconsistent with the inventions herein.

The "condensable fluids" that can be used in one of the condensed mode gas phase polymerization operations may include saturated or unsaturated hydrocarbons. Examples of suitable inert condensable fluids are readily volatile liquid hydrocarbons, which may be selected from saturated hydrocarbons containing from 2 to 8 carbon atoms. Some suitable saturated hydrocarbons are propane, n-butane, isobutane, n-pentane, isopentane, neopentane, n-hexane, isohexane, and other saturated C6 hydrocarbons, n-heptane, n-octane and other saturated C7 and C8 hydrocarbons or mixtures thereof. The preferred inert condensable hydrocarbons are C4 and C6 saturated hydrocarbons. The condensable fluids may also include polymerizable condensable comonomers such as olefins, alpha-olefins, diolefins, diolefins containing at least one alphaolefin or mixtures thereof including some of the aforementioned monomers which may be partially or entirely incorporated into the polymer product.

In any of the gas phase polymerization processes described herein, including those in the patents referenced herein, the unreacted monomers in the product stream may be recycled. Preferably, to make the VLDPEs of the invention with the desired density, the composition of the recycle stream should be carefully controlled so that the proper ratio of comonomers is maintained, as discussed above.

The density of the polyethylene having the improved properties of this invention ranges from the lower limits of 0.890 g/cm$^3$, 0.900 g/cm$^3$, 0.905 g/cm$^3$, 0.910 g/cm$^3$ or 0.911 g/cm$^3$ to the upper limits of 0.915 g/cm$^3$ or 0.913 g/cm$^3$.

The VLDPE polymer is further characterized by a melt index (MI) of from 0.5 to 50 g/10 min (dg/min), as measured in accordance with ASTM-1238 condition E. In one or more specific embodiments, alternative lower limits for the melt index include 0.7 and 1.0 g/10 min, and alternative upper limits for the melt index include 5, 10, 12, 15, and 20 g/10 min, with melt index ranging from any lower limit to any upper limit being within the scope of the invention.

The preferred gas-phase, metallocene VLDPE polymers can be further characterized by a narrow composition distribution. As is well known to those skilled in the art, the composition distribution of a copolymer relates to the uniformity of distribution of comonomer among the molecules of the polymer. Metallocene catalysts are known to incorporate comonomer very evenly among the polymer molecules they produce. Thus, copolymers produced from a catalyst system having a single metallocene component have a very narrow composition distribution, in that most of the polymer molecules will have roughly the same comonomer content, and within each molecule the comonomer will be randomly distributed. By contrast, conventional Ziegler-Natta catalysts generally yield copolymers having a considerably broader composition distribution, with comonomer inclusion varying widely among the polymer molecules.

A measure of composition distribution is the "Composition Distribution Breadth Index" ("CDBI"). The definition of Composition Distribution Breadth Index (CDBI), and the method of determining CDBI, can be found in U.S. Pat. No. 5,206,075 and PCT publication WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in Wild, et al., *J. Poly. Sci., Poly. Phys. Ed.*, vol. 20, p. 441 (1982).

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a Mn≧15,000, where Mn is the number average molecular weight of the fraction. Any low weight fractions present generally represent a trivial portion of the VLDPE polymers. The remainder of this description and the appended claims maintain this convention of assuming all fractions have Mn≧15,000 in the CDBI measurement.

The VLDPE polymers can also be characterized by molecular weight distribution (MWD). Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part* II, Marcel Dekker, Inc., NY, (1975) 287–368; Rodriguez, F., *Principles of Polymer Systems* 3rd ed., Hemisphere Pub. Corp., NY, (1989) 155–160; U.S. Pat. No. 4,540,753; Verstrate et al., *Macromolecules*, vol. 21, (1988) 3360; and references cited therein.

The VLDPE polymers recited in the claims below are preferably linear polymers, i.e., without long chain branching. As used in the present disclosure, the term "linear" is applied to a polymer that has a linear backbone and does not have long chain branching; i.e., a "linear" polymer is one that does not have the long chain branches characteristic of a SLEP polymer as defined in U.S. Pat. Nos. 5,272,236 and 5,278,272. Thus, a "substantially" linear polymer as disclosed in those patents is not a "linear" polymer because of the presence of long chain branching.

Preferred VLDPE polymers have one or more of the following characteristics, in addition to the density, melt index, and other parameters described herein:

(a) a composition distribution CDBI of 50 to 85%, alternatively 60 to 80% or 55 to 75%, or 55% or more to 70% or less;

(b) a molecular weight distribution Mw/Mn of 2 to 3, alternatively 2.2 to 2.8;

(c) a molecular weight distribution Mz/Mw of less than 2; and (d) the presence of two peaks in a TREF measurement.

Particularly preferred VLDPEs having some or all of these characteristics are the gas phase metallocene-produced VLDPEs described above.

Two peaks in the TREF measurement as used in this specification and the appended claims means the presence of two distinct normalized ELS (evaporation mass light scattering) response peaks in a graph of normalized ELS response (vertical or y axis) versus elution temperature (horizontal or x axis with temperature increasing from left to right) using the TREF method disclosed in the EXAMPLES section below. A "peak" in this context means where the general slope of the graph changes from positive to negative with increasing temperature. Between the two peaks is a local minimum in which the general slope of the graph changes from negative to positive with increasing temperature. "General trend" of the graph is intended to exclude the multiple local minimums and maximums that can occur in intervals of 2° C. or less. Preferably, the two distinct peaks are at least 3° C. apart, more preferably at least 4° C. apart, even more preferably at least 5° C. apart. Additionally, both of the distinct peaks occur at a temperature on the graph above 20° C. and below 120° C. where the elution temperature is run to 0° C. or lower. This limitation avoids confusion with the apparent peak on the graph at low temperature caused by material that remains soluble at the lowest elution temperature. Two peaks on such a graph indicates a bi-modal composition distribution (CD). Bimodal CD may also be determined by other methods known to those skilled in the art. One such alternate method for TREF measurement than can be used if the above method does not show two peaks is disclosed in B. Monrabal, "Crystallization Analysis Fractionation: A New Technique for the Analysis of Branching Distribution in Polyolefins," Journal of Applied Polymer Science, Vol. 52, 491–499 (1994).

A preferred balance of properties, particularly in film applications, according to the invention is achieved when the long chain branching of the VLDPE is reduced. Therefore, with respect to the catalyst structures described above, bis-Cp structures are preferred over mono-Cp structures, unbridged structures are preferred over bridged structures, and unbridged bis-Cp structures are the most preferred. Preferred catalyst systems which will minimize or eliminate long chain branching to produce polymers substantially free of or free of long chain branching are based on unabridged bis-Cp zirconocenes, such as but not limited to bis (1-methyl-3-n-butyl cyclopentadiane) zirconium dichloride.

Symmetric metallocenes may be used to produce a VLDPE polymer of the present invention. Symmetric metallocenes include, but are not limited to,
bis(methylcyclopentadienyl)zirconium dichloride, bis(1,3-dimethylcyclopentadienyl)zirconium dichloride, bis(1,2-dimethylcyclopentadienyl)zirconium dichloride, bis(1,2,4-trimethylcyclopentadienyl)zirconium dichloride, bis(1,2,3-trimethylcyclopentadienyl)zirconium dichloride, bis(tetramethylcyclopentadienyl)zirconium dichloride, bis(pentamethylcyclopentadienyl)zirconium dichloride, bis(ethylcyclopentadienyl)zirconium dichloride, bis(propylcyclopentadienyl)zirconium dichloride, bis(butylcyclopentadienyl)zirconium dichloride, bis(isobutylcyclopentadienyl)zirconium dichloride, bis(pentylcyclopentadienyl)zirconium dichloride, bis(isopentylcyclopentadienyl)zirconium dichloride, bis(cyclopentylcyclopentadienyl)zirconium dichloride, bis(phenylcyclopentadienyl)zirconium dichloride, bis(benzylcyclopentadienyl)zirconium dichloride, bis(trimethylsilylmethylcyclopentadienyl)zirconium dichloride, bis(cyclopropylmethylcyclopentadienyl) zirconium dichloride, bis(cyclopentylmethylcyclopentadienyl)zirconium dichloride, bis(cyclohexylmethylcyclopentadienyl) zirconium dichloride, bis(propenylcyclopentadienyl) zirconium dichloride, bis(butenylcyclopentadienyl) zirconium dichloride, bis(1,3-ethylmethylcyclopentadienyl)zirconium dichloride, bis(1,3-propylmethylcyclopentadienyl)zirconium dichloride, bis(1,3-butylmethylcyclopentadienyl)zirconium dichloride, bis(1,3-isopropylmethylcyclopentadienyl) zirconium dichloride, bis(1,3-isobutylmethylcyclopentadienyl)zirconium dichloride, bis(1,3-methylcyclopentylcyclopentadienyl)zirconium dichloride, and bis(1,2,4-dimethylpropylcyclopentadienyl)zirconium dichloride.

Unsymmetric metallocenes may be used to produce a VLDPE polymer of the present invention. Unsymmetric metallocenes include, but are not limited to, cyclopentadienyl(1,3-dimethylcyclopentadienyl)zirconium dichloride, cyclopentadienyl(1,2,4-trimethylcyclopentadienyl)zirconium dichloride, cyclopentadienyl(tetramethylcyclopentadienyl)zirconium dichloride, cyclopentadienyl(pentamethylcyclopentadienyl) zirconium dichloride, cyclopentadienyl (propylcyclopentadienyl)zirconium dichloride, cyclopentadienyl(butylcyclopentadienyl)zirconium dichloride, cyclopentadienyl(pentylcyclopentadienyl) zirconium dichloride, cyclopentadienyl (isobutylcyclopentadienyl)zirconium dichloride, cyclopentadienyl(cyclopentylcyclopentadienyl)zirconium dichloride, cyclopentadienyl(isopentylcyclopentadienyl) zirconium dichloride, cyclopentadienyl (benzylcyclopentadienyl)zirconium dichloride, cyclopentadienyl(phenylcyclopentadienyl)zirconium dichloride, cyclopentadienyl(1,3-propylmethylcyclopentadienyl)zirconium dichloride, cyclopentadienyl(1,3-butylmethylcyclopentadienyl) zirconium dichloride, cyclopentadienyl(1,3-isobutylmethylcyclopentadienyl)zirconium dichloride, cyclopentadienyl(1,2,4-dimethylpropylcyclopentadienyl) zirconium dichloride, (tetramethylcyclopentadienyl) (methylcyclopentadienyl) zirconium dichloride, (tetramethylcyclopentadienyl)(1,3-dimethylcyclopentadienyl)zirconium dichloride, (tetramethylcyclopentadienyl)(1,2,4-trimethylcyclopentadienyl)zirconium dichloride, (tetramethylcyclopentadienyl)(propylcyclopentadienyl) zirconium dichloride, (tetramethylcyclopentadienyl) (cyclopentylcyclopentadienyl)zirconium dichloride, (pentamethylcyclopentadienyl)(methylcyclopentadienyl) zirconium dichloride, (pentamethylcyclopentadienyl)(1,3-dimethylcyclopentadienyl)zirconium dichloride, (pentamethylcyclopentadienyl)(>1,2,4-trimethylcyclopentadienyl)zirconium dichloride, (pentamethylcyclopentadienyl)(propylcyclopentadienyl) zirconium dichloride, (pentamethylcyclopentadienyl) (cyclopentylcyclopentadienyl)zirconium dichloride, cyclopentadienyl(ethyltetramentylcyclopentadienyl) zirconium dichloride, cyclopentadienyl (propyltetramentylcyclopentadienyl)zirconium dichloride, (methylcyclopentadienyl) (propyltetramentylcyclopentadienyl)zirconium dichloride, (1,3-dimethylcyclopentadienyl)

(propyltetramentylcyclopentadienyl)zirconium dichloride, (1,2,4-trimethylcyclopentadienyl) (propyltetramentylcyclopentadienyl)zirconium dichloride, (propylcyclopentadienyl) (propyltetramentylcyclopentadienyl)zirconium dichloride, cyclopentadienyl(indenyl)zirconium dichloride, (methylcyclopentadienyl)(indenyl)zirconium dichloride, (1,3-dimethylcyclopentadienyl)(indenyl)zirconium dichloride, (1,2,4-trimethylcyclopentadienyl)(indenyl) zirconium dichloride, (tetramethylcyclopentadienyl) (indenyl)zirconium dichloride, (pentamethylcyclopentadienyl)(indenyl)zirconium dichloride, cyclopentadienyl(1-methylindenyl)zirconium dichloride, cyclopentadienyl(1,3-dimethylindenyl) zirconium dichloride, cyclopentadienyl(1,2,3-trimethylindenyl)zirconium dichloride, cyclopentadienyl(4,7-dimethylindenyl)zirconium dichloride, (tetramethylcyclopentadienyl)(4,7-dimethylinde>nyl) zirconium dichloride, (pentamethylcyclopentadienyl)(4,7-dimethylindenyl)zirconium dichloride, cyclopentadienyl(5,6-dimethylindenyl)zirconium dichloride, (pentamethylcyclopentadienyl)(5,6-dimethylindenyl) zirconium dichloride, and (tetramethylcyclopentadienyl)(5,6-dimethylindenyl)zirconium dichloride.

The preferred method for producing the catalyst of the invention is described below and can be found in U.S. application Ser. Nos. 265,533, filed Jun. 24, 1994, now abandoned, and 265,532, filed Jun. 24, 1994, now abandoned, both are hereto fully incorporated by reference in their entirety. In a preferred embodiment, the metallocene catalyst component is typically slurried in a liquid to form a metallocene solution and a separate solution is formed containing an activator and a liquid. The liquid can be any compatible solvent or other liquid capable of forming a solution or the like with at least one metallocene catalyst component and/or at least one activator. In the preferred embodiment the liquid is a cyclic aliphatic or aromatic hydrocarbon, most preferably toluene. The metallocene and activator solutions are preferably mixed together and added to a porous support such that the total volume of the metallocene solution and the activator solution or the metallocene and activator solution is less than four times the pore volume of the porous support, more preferably less than three times, even more preferably less than two times, and more preferably in the 1–1.5 times to 2.5–4 times range and most preferably in the 1.5 to 3 times range. Also, in the preferred embodiment, an antistatic agent is added to the catalyst preparation.

In one embodiment, the metallocene catalyst is prepared from silica dehydrated at 600° C. The catalyst is a commercial scale catalyst prepared in a mixing vessel with and agitator. An initial charge of 1156 pounds (462 Kg) toluene is added to the mixer. This was followed by mixing 925 pounds (421 Kg) of 30 percent by weight methyl aluminoxane in toluene. This is followed with 100 pounds (46 Kg) of 20 percent by weight bis(1,3-methyl-n-butyl cyclopentadienyl) zirconium dichloride in toluene (20.4 pounds (9.3 Kg) of contained metallocene). An additional 144 pounds (66 Kg) of toluene is added to the mixer to rinse the metallocene feed cylinder and allowed to mix for 30 minutes at ambient conditions. This is followed by 54.3 pounds (25 Kg) of an AS-990 in toluene, surface modifier solution, containing 5.3 pounds (2.4 Kg) of contained AS-990. An additional 100 pounds (46 Kg) of toluene rinsed the surface modifier container and was added to the mixer. The resulting slurry is vacuum dried at 3.2 psia (70.6 kPa) at 175° F. (79° C.) to a free flowing powder. The final catalyst weight was 1093 pounds (497 Kg). The catalyst can have a final zirconium loading of 0.40% and an aluminum loading of 12.0%.

In one preferred embodiment a substantially homogenous catalyst system is preferred. For the purposes of this patent specification and appended claims, a "substantially homogenous catalyst" is one in which the mole ratio of the transition metal of the catalyst component, preferably with an activator, is evenly distributed throughout a porous support.

The procedure for measuring the total pore volume of a porous support is well known in the art. Details of one of these procedures is discussed in Volume 1, Experimental Methods in Catalytic Research (Academic Press, 1968) (specifically see pages 67–96). This preferred procedure involves the use of a classical BET apparatus for nitrogen absorption. Another method well know in the art is described in Innes, Total porosity and Particle Density of Fluid Catalysts By Liquid Titration, Vol. 28, No. 3, Analytical Chemistry 332–334 (March, 1956).

The mole ratio of the metal of the activator component to the transition metal of the metallocene component is in the range of ratios between 0.3:1 to 1000:1, preferably 20:1 to 800:1, and most preferably 50:1 to 500:1. Where the activator is an ionizing activator as previously described the mole ratio of the metal of the activator component to the transition metal component is preferably in the range of ratios between 0.3:1 to 3: 1. component to the transition metal component is preferably in the range of ratios between 0.3:1 to 3:1.

Typically in a gas phase polymerization process a continuous cycle is employed where in one part of the cycle of a reactor, a cycling gas stream, otherwise known as a recycle stream or fluidizing medium, is heated in the reactor by the heat of polymerization. This heat is removed in another part of the cycle by a cooling system external to the reactor. (See for example U.S. Pat. Nos. 4,543,399, 4,588,790, 5,028,670, 5,352,749, 5,405,922, 5,436,304, 5,453,471 and 5,462,999 all of which are fully incorporated herein by reference.)

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

In one embodiment of the process of the invention the process is essentially free of a scavenger. For the purposes of this patent specification and appended claims the term "essentially free" means that during the process of the invention no more than 10 ppm of a scavenger based on the total weight of the recycle stream is present at any given point in time during the process of the invention.

In another embodiment of the process of the invention the process is substantially free of a scavenger. For the purposes of this patent specification and appended claims the term "substantially free" is defined to be that during the process of the invention no more than 50 ppm of a scavenger based on the total weight of a fluidized bed is present at any given point in time during the process of the invention.

In one embodiment during reactor start-up to remove impurities and ensure polymerization is initiated, a scavenger is present in an amount less than 300 ppm, preferably less than 250 ppm, more preferably less than 200 ppm, even more preferably less than 150 ppm, still more preferably less than 100 ppm, and most preferably less than 50 ppm based on the total bed weight of a fluidized bed during the first 12 hours from the time the catalyst is placed into the reactor, preferably up to 6 hours, more preferably less than 3 hours, even more preferably less than 2 hours, and most preferably less than 1 hour and then the introduction of the scavenger is halted.

In another embodiment of the process of the invention the scavenger is present in an amount sufficient until the catalyst of the invention has achieved a catalyst productivity on a weight ratio basis of greater than 1000 grams of polymer per gram of the catalyst, preferably greater than about 1500, more preferably greater than 2000, even more preferably greater than 2500, and most preferably greater than 3000.

In another embodiment of the process of the invention during start-up the scavenger is present in an amount sufficient until the catalyst of the invention has achieved a catalyst productivity 40 percent of that of steady-state, preferably less than 30 percent, even more preferably less than 20 percent and most preferably less than 10 percent. For the purposes of this patent specification and appended claims "steady state" is the production rate, weight of polymer being produced per hour.

The productivity of the catalyst or catalyst system is influenced by the main monomer, (i.e., ethylene or propylene) partial pressure. The preferred mole percent of the monomer, ethylene or propylene, is from about 25 to 90 mole percent and the monomer partial pressure is in the range of from about 75 psia (517 kPa) to about 300 psia (2069 kPa), which are typical conditions in a gas phase polymerization process.

When a scavenger is utilized in the process of the invention the scavenger can be introduced typically into the reactor directly or indirectly into the recycle stream or into any external means capable of introducing the scavenger into the reactor. Preferably the scavenger enters into the reactor directly, and most preferably directly into the reactor bed or below the distributor plate in a typical gas phase process, preferably after the bed is in a fluidized state. In one embodiment the scavenger can be introduced once, intermittently or continuously to the reactor system.

The scavenger used in the process of the invention is introduced to the reactor at a rate equivalent to 10 ppm to 100 ppm based on the steady state, production rate, and then scavenger introduction is stopped.

In yet another embodiment particularly during start-up the scavenger when used is introduced at a rate sufficient to provide an increase in catalyst productivity on a weight ratio basis of a rate of 200 grams of polymer per gram of catalyst per minute, preferably at a rate of 300, even more preferably at a rate of 400 and most preferably at a rate of 500.

In another embodiment, the mole ratio of the metal of the scavenger to the transition metal of the metallocene catalyst component equals about, about 0.2 multiplied by the ppm of a scavenger based on the production rate multiplied by the catalyst productivity in kilograms of polymer per gram of catalyst. The range of the mole ratio is from about 300 to 10. In a preferred embodiment, where an alkyl aluminum is used as the scavenger the mole ratio is represented as aluminum (Al) to transition metal, for example, zirconium, where the moles of. Al are based on the total amount of scavenger used.

It is also preferred that hydrogen not be added to the system simultaneously with the scavenger. It is also within the scope of this invention that the scavenger can be introduced on a carrier separate from that used when a supported metallocene catalyst system is used in the process of the invention.

Fines for the purpose of this patent specification and appended claims are polymer particles less than 125 mu in size. Fines of this size can be measured by using a standard 120 mesh unit sieve screen. In a preferred embodiment the amount of scavenger present in the reactor at any given point in time during the process of the invention the level of fines less than 125 mu is less than 10%, preferably less than 1%, more preferably less than 0.85% to less than 0.05%.

It is within the scope of the invention that a system external to the reactor for removing scavengers introduced in the process of the invention from the recycle stream may be used. This would then prevent the recycle of the scavenger back into the reactor and prevent scavenger build-up in the reactor system. It is preferred that such a system is placed prior to the heat exchanger or compressor in the recycle stream line. It is contemplated that such a system would condense the scavenger out of the fluidizing medium in the recycle stream line. It would be preferred that the fluidizing medium is treated to remove the scavenger, see for example U.S. Pat. No. 4,460,755, incorporated herein by reference.

It is also contemplated by the process of the invention that scavenger can be intermittently introduced during the process wherein greater than 90%, preferably greater than 95% of all the scavenger introduced is removed from the recycle stream. It is also contemplated by this invention that the catalyst or catalyst system or components thereof of the invention can be used upon start-up as a scavenger, however, this would be an expensive procedure.

In the most preferred embodiment of the invention the process is a gas phase polymerization process operating in a condensed mode. For the purposes of this patent specification and appended claims the process of purposefully introducing a recycle stream having a liquid and a gas phase into a reactor such that the weight percent of liquid based on the total weight of the recycle stream is greater than about 2.0 weight percent is defined to be operating a gas phase polymerization process in a "condensed mode".

In one embodiment of the process of the invention the weight percent of liquid in the recycle stream based on the total weight of the recycle stream is in the range of about 2 to about 50 weight percent, preferably greater than 10 weight percent and more preferably greater than 15 weight percent and even more preferably greater than 20 weight percent and most preferably in the range between about 20 and about 40 percent. However, any level of condensed can be used depending on the desired production rate.

In another embodiment of the process of the invention the amount of scavenger utilized if any is used should be in a mole ratio less than 100, preferably less than 50, more preferably less than about 25 based on the mole ratio of the metal of the transition metal scavenger to the transition metal of the metallocene where the scavenger is an aluminum containing organometallic compound and the transition metal of the metallocene is a Group 4 metal then the mole ratio above is based on the moles of aluminum to the moles of the Group 4 metal of the catalyst.

Fouling is a term used to describe the collection of polymer deposits on surfaces in a reactor. Fouling is detrimental to all parts of a polymerization process, including the reactor and its associated systems, hardware, etc. Fouling is especially disruptive in areas restricting gas flow or liquid flow. The two major areas of primary concern are the heat exchanger and distributor plate fouling. The heat exchanger consists of a series of small diameter tubes arranged in a tube bundle. The distributor plate is a solid plate containing numerous small diameter orifices through which the gas contained in a recycle stream is passed through before entering the reaction zone or distributed into a bed of solid polymer in a fluidized bed reactor such as described in U.S. Pat. No. 4,933,149, incorporated herein by reference.

Fouling manifests itself as an increase in the pressure drop across either the plate, cooler, or both. Once the pressure drop becomes too high, gas or liquid can no longer be circulated efficiently by the compressor, and it is often necessary to shut the reactor down. Cleaning out the reactor can take several days and is very time consuming and costly. Fouling can also occur in the recycle gas piping and compressor, but usually accompanies plate and cooler fouling.

To quantify the rate of fouling it is useful to define a fouling factor, F. F is the fraction of the area of a hole that is fouled. If F=0 (0%) then there is no fouling. Conversely, if F=1 (100%) the hole is completely plugged. It is possible to relate the fouling to the pressure drop, DELTA P, at a given time in terms of the pressure drop of a clean system, DELTA P0. As fouling increases DELTA P increases and is larger than the initial pressure drop, DELTA P0. F is given by the following expressions: [See equation in original] (I) Cooler Fouling [See Original Patent for Chemical Structure Diagram] (II) In general, when F is greater than about 0.3 to about 0.4 (30–40%) a reactor shutdown is inevitable. Preferably, F is less than 40%, preferably less than 30%, even more preferably less than 20%, still more preferably less than 15% and most preferably less than 10% to 0%. The rate of fouling, the change in F as a function of time, is used to quantify fouling. If no fouling occurs the rate of fouling is zero. A minimum acceptable rate of fouling for a commercial operation is about 12 percent/month or 0.4 percent/day, preferably less than 0.3 percent/day, even more preferably less than 0.2 percent/day and most preferably less than 0.1 percent/day.

Particle size is determined as follows; the particle size is measured by determining the weight of the material collected on a series of U.S. Standard sieves and determining the weight average particle size.

Fines are defined as the percentage of the total distribution passing through 120 mesh standard sieve.

In one embodiment, the process is operated using a metallocene catalyst based on bis(1,3-methyl-n-butyl cyclopentadienyl) zirconium dichloride is described in this example. It shows the fouling effect of operating a commercial reactor using TEAL. This example includes information from a startup of a commercial reactor on metallocene catalyst.

Possible optimizations of the gas phase polymerization process and additional catalyst preparations are disclosed in U.S. Pat. Nos. 5,763,543, 6,087,291, and 5,712,352, and PCT published applications WO 00/02930 and WO 00/02931.

One aspect of the invention relates to the formation of monolayer films. Such a film can include a VLDPE "neat" resin alone, or, alternatively, the single layer film can be formed from a VLDPE blended with another polymer component, i.e, a "blend." These films may be formed by any number of well known extrusion or coextrusion techniques discussed below. Films of the invention may be unoriented, uniaxially oriented or biaxially oriented. Physical properties of the film may vary depending on the film forming techniques used.

Another aspect of the invention relates to the formation of multilayer films. Multiple-layer films may be formed by methods well known in the art. The total thickness of a multilayer film may vary based upon the desired application. A total film thickness of about 5–100 μm, more typically about 10–50 μm, is suitable for most applications. Those skilled in the art will appreciate that the thickness of each individual layer in a multilayer film may be adjusted based on desired end use performance, resin or copolymer employed, equipment capability and other factors. The materials forming each layer may be coextruded through a coextrusion feedblock and die assembly to yield a film with two or more layers which are adhered together but which may differ in composition.

When used in multilayer films, any of the VLDPE polymers disclosed herein may be used in any layer of the film, or in more than one layer of the film, as desired. When more than one layer of the film is formed using a VLDPE polymer of the present invention, each such layer can be individually formulated; i.e., the layers formed of the VLDPE polymer can be the same or different chemical composition, density, melt index, thickness, etc., depending upon the desired properties of the film.

To facilitate discussion of different film structures of the invention, the following notation is used herein. Each layer of a film is denoted "A" or "B", where "A" indicates a conventional (wherein the term "conventional" is intended to mean any polymer other than the VLDPEs of this invention) film layer as defined below, and "B" indicates a film layer formed of any of the VLDPE polymers of the present invention. Where a film includes more than one A layer or more than one B layer, one or more prime symbols (',",''', etc.) is appended to the A or B symbol to indicate layers of the same type (conventional or inventive) that can be the same or can differ in one or more properties, such as chemical composition, density, melt index, thickness, etc. Finally, the symbols for adjacent layers are separated by a slash (/). Using this notation, a three-layer film having an inner layer of a VLDPE polymer of the invention disposed between two outer, conventional film layers would be denoted A/B/A'. Similarly, a five-layer film of alternating conventional/inventive layers would be denoted A/B/A'/B'/A". Unless otherwise indicated, the left-to-right or right-to-left order of layers does not matter, nor does the order of prime symbols; e.g., an A/B film is the same as a B/A film, and an A/A'/B/A" film is the same as an A/B/A'/A" film, for purposes of the present invention. The relative thickness of each film layer is similarly denoted, with the thickness of each layer relative to a total film thickness of 100 (dimensionless) is indicated numerically and separated by slashes; e.g., the relative thickness of an A/B/A' film having A and A' layers of 10 μm each and a B layer of 30 μm is denoted as 20/60/20.

For the various films described herein, the "A" layer can be formed using any material known in the art for use in multilayer films or in film-coated products. Thus, for example, the A layer can include a polyethylene homopolymer or copolymer, and the polyethylene can be, for example, a VLDPE, a low density polyethylene (LDPE), an LLDPE, a medium density polyethylene (MDPE), or a high density polyethylene (HDPE), as well as other polyethylenes known in the art. The polyethylene can be produced by any suitable process, including metallocene-catalyzed processes and Ziegler-Natta catalyzed processes. Further, the A layer can be a blend of two or more such polyethylenes, and can include additives known in the art. Further, one skilled in the art will understand that the layers of a multilayer film must have the appropriate viscosity match.

In multilayer structures, one or more A layers can also be an adhesion-promoting tie layer, such as PRIMACOR™ ethylene-acrylic acid copolymers available from The Dow Chemical Co., and/or ethylene-vinyl acetate copolymers. Other materials for A layers can be, for example, foil, nylon, ethylene-vinyl alcohol copolymers, polyvinylidene chloride, polyethylene terephthalate, oriented polypropylene, ethylene-vinyl acetate copolymers, ethylene-acrylic acid copolymers, ethylene-methacrylic acid copolymers, graft modified polymers, other polyethylenes, such as HDPE, LDPE, LMDPE, and MDPE, and paper.

In one embodiment, the B layer comprises a gas-phase metallocene-produced VLDPE having a melt index having the lower limits of 0.5 g/10 min or more, 0.7 g/10 min or more, 1 g/10 min or more and having the upper limits of 5 g/10 min or less, 3 g/10 min or less, or 2 g/10 min or less, with melt index ranges from any lower limit to any upper limit being within the scope of the invention.

The thickness of each layer of the film, and of the overall film, is not particularly limited, but is determined according to the desired properties of the film. Typical film layers have a thickness of about 1 to 1000 μm, more typically about 5 to 100 μm, and typical films have an overall thickness of 10 to 100 μm.

In one embodiment, the present invention provides a single-layer (monolayer) film formed of any of the VLDPE polymers of the invention; i.e., a film having a single layer which is a B layer as described above.

In other embodiments, and using the nomenclature described above, the present invention provides multilayer films with any of the following exemplary structures:

(a) two-layer films, such as A/B and B/B';

(b) three-layer films, such as A/B/A', A/A'/B, B/A/B/' and B/B'/B'';

(c) four-layer films, such as A/A'/A''/B, A/A'/B/A'', A/A'/B/B', A/B/A'/B', A/B/B'/A', B/A/A'/B', A/B/B'/B'', B/A/B'/B'' and B/B'/B''/B''';

(d) five-layer films, such as A/A'/A''/A'''/B, A/A'/A''/B/A''', A/A'/B/A''/A''', A/A'/A''/B/B', A/A'/B/A''/B', A/A'/B/B'/A'', A/B/A'/B'/A'', A/B/A'/A''/B, B/A/A'/A''/B', A/A'/B/B'/B'', A/B/A'/B'/B'', A/B/B'/B''/A', B/A/A'/B'/B'', B/A/B'/A'/B'', B/A/B'/B''/A', A/B/B'/B''/B''', B/A/B'/B''/B''', B/B'/A/B''/B''', and B/B'/B''/B'''/B'''';

and similar structures for films having six, seven, eight, nine or more layers. It should be appreciated that films having still more layers can be formed using the VLDPE polymers of the invention, and such films are within the scope of the invention.

In any of the embodiments above, one or more A layers can be replaced with a substrate layer, such as glass, plastic, paper, metal, etc., or the entire film can be coated or laminated onto a substrate. Thus, although the discussion herein has focussed on multilayer films, the films of the VLDPE polymers of the present invention can also be used in as coatings; e.g., films formed of the inventive polymers, or multilayer films including one or more layers formed of the inventive polymers, can be coated onto a substrate such as paper, metal, glass, plastic and other materials capable of accepting a coating. Such coated structures are also within the scope of the present invention.

As described below, the films can be cast films or blown films. The films can further be embossed, or produced or processed according to other known film processes. The films can be tailored to specific applications by adjusting the thickness, materials and order of the various layers, as well as the additives in each layer.

In one aspect of this invention, films containing VLDPE (monolayer or multilayer film) may be formed by using casting techniques, such as a chill roll casting process. For example, a composition can be extruded in a molten state through a flat die and then cooled to form a film. As a specific example, cast films can be prepared using a pilot scale commercial cast film line machine as follows. Pellets of the polymer are melted at a temperature ranging from about 250° C. to about 300° C., with the specific melt temperature being chosen to match the melt viscosity of the particular resins. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically about 0.025 inches (about 600 μm). The material is then drawn down to the final gauge. The material draw down ratio is typically about 21:1 for 0.8 mil (20 μm) films. A vacuum box or air knife can be used to pin the melt exiting the die opening to a primary chill roll maintained at about 90° F. (32 C). The resulting polymer film is collected on a winder. The film thickness can be monitored by a gauge monitor, and the film can be edge trimmed by a trimmer. One or more optional treaters can be used to surface treat the film, if desired. A chill roll casting process and apparatus that can be used to form a VLDPE of this invention suitably modified in accordance with the specifications described herein are described, for example, in The Wiley Encyclopedia of Packaging Technology, Second Edition, A. L. Brody and K. S. Marsh, Ed., John Wiley and Sons, Inc., New York (1997). Although chill roll casting is one example, other forms of casting can be used.

In another aspect of this invention, films containing VLDPE (monolayer or multilayer films) may be formed using blown techniques, i.e., to form a blown film. For example, a composition can be extruded in a molten state through an annular die and then blown and cooled to form a tubular, blown film, which can then be axially slit and unfolded to form a flat film. As a specific example, blown films can be prepared as follows. The VLDPE polymer composition is introduced into the feed hopper of an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film is extruded through the die into a film that was cooled by blowing air onto the surface of the film. The film is drawn from the die typically forming a cylindrical film that is cooled, collapsed and optionally subjected to a desired auxiliary process, such as slitting, treating, sealing or printing. The finished film can be wound into rolls for later processing, or can be fed into a bag machine and converted into bags. A blown film process and apparatus that can be used to form a VLDPE according to one or more embodiments of the present invention, suitably modified as described herein, is described in U.S. Pat. No. 5,569,693, incorporated herein by reference. Of course, other blown film forming methods can also be used.

Yet another aspect of the invention relates to an article formed by extrusion coating. For example, a substrate material can be contacted with a hot molten VLDPE polymer as the polymer exits the die. More specifically, an already formed polypropylene film (a substrate) may be extrusion coated with a VLDPE polymer film as the latter is extruded through the die. Extrusion coatings are generally processed at higher temperatures than cast films, typically about 600° F., in order to promote adhesion of the extruded material to the substrate. Other extrusion coating processes can be used, including those described, for example, in U.S. Pat. Nos. 5,268,230, 5,178,960 and 5,387,630, incorporated herein by reference. In one embodiment, the present invention is directed to a metallocene VLDPE film or coating on a flexible substrate such as paper, metal foil or the like, wherein the film or coating comprises a VLDPE resin or a blend thereof. The coating may be a monolayer film or a multilayer film. The substrate can also be stock for milk cartons, juice containers, films, etc.

In one embodiment, the coating is formed of a gas-phase metallocene-produced VLDPE, the VLDPE having a melt index having the lower limits of 5 g/10 min or more, 7 g/10 min or more, 9 g/10 min or more, 13 g/10 min or more, 14 g/10 min or more, 15 g/10 min and having the upper limit of 20 g/10 min or less, with melt index ranges from any lower limit to the upper limit being within the scope of the invention.

The films and coatings of the present invention are also suitable for use in laminate structures; i.e., with a film or a coating as described herein disposed between two substrates. These films and coatings are also suitable for use as heat sealing or moisture barrier layers in single- or multilayer structures.

It should be emphasized that the VLDPE resins, blends, mono-layer and multilayer films, coatings, laminates, and other structures of the present invention can be produced by the methods described herein, or by other methods know in the art, and can use VLDPE polymers produced by the methods described herein, or VLDPE polymers produced by other methods known in the art for use in making metallocene VLDPE polymers.

Another aspect of the invention relates to a polymer product containing any one of the very low density polyethylenes (VLDPEs) made using a gas phase polymerization process carried out in the presence of metallocene. Such polymer products preferably contain a sufficient amount of the VLDPE to provide them with improved properties such as the toughness properties described above in the Summary, e.g.,, the above-mentioned Dart Drop and/or Puncture values. Such products include a number of film-based products, such as films made from the VLDPEs, cast films, meltblown films, coextruded films, films made of blends of VLDPE together with other polymers, laminated films, extrusion coatings, films with high oxygen transmission rates, multilayer films containing the VLDPEs, sealing layers and cling layers that contain the VLDPEs and products that include such sealing layers and cling layers. The multilayer films of the invention include a neat m-VLDPE layer or a in-VLDPE blend layer coextruded with metallocene catalyzed LLDPE, Ziegler-Natta catalyzed LLDPE, LDPE, MDPE, HDPE, EVA, EMA, polypropylene or other polymers. The blends of the invention, have the VLDPE together with other polymers, such as metallocene catalyzed LLDPE, Ziegler-Natta catalyzed LLDPE, LDPE, MDPE, HDPE, EVA, EMA, polypropylene and copolymers such as ethylene/propylene copolymers. Another product of this invention includes VLDPE that has been rendered breathable and used either alone (as a single layer film) or in combination with one or more other layers or films or fabrics, including woven or nonwoven films or fabrics. The products also include extrusion coating compositions containing the VLDPE. These films can be made into other forms, such as tape, by any one of a number of well known cutting, slitting, and/or rewinding techniques. They may be useful as stretch, sealing, or oriented films. Surfaces of the films of this invention can be modified by known and conventional post-forming techniques such as corona discharge, chemical treatment, flame treatment, and the like.

This invention also includes products having specific end-uses, particularly film-based products for which the toughness properties are desirable, such as cling films, produce bags, lamination films, stretch films, bags (i.e. shipping sacks, trash bags and liners, industrial liners, and produce bags), flexible and food packaging (e.g., fresh cut produce packaging, frozen food packaging), personal care films pouches, medical film products (such as IV bags), diaper films, and housewrap. Products may also include packaging as bundling, packaging and unitizing a variety of products including various foodstuffs, rolls of carpet, liquid containers and various like goods normally containerized and/or palletized for shipping, storage, and/or display. Products may also include surface protection applications, with or without stretching, such as in the temporary protection of surfaces during manufacturing, transportation, etc. There are many potential applications of films produced from the polymer blends described herein that will be apparent to those skilled in the art.

EXAMPLES

The following examples will now reveal additional details concerning how selected versions of the gas polymerization process of this invention can be carried out, and will also illustrate certain features, advantages and properties of non-limiting examples of polymers made using invention processes.

Metallocene catalysts for the polymerization of the inventive VLDPE were prepared according to the methods as described above for an unbridged bis-Cp structure (such as a bis(1,3-methyl-n-butyl cyclopentadienyl) zirconium dichloride).

In certain examples, various properties of the polymers were measured according to the following test procedures, and it is understood that whenever these properties are discussed in this specification and in the claims, such properties are to be measured in accordance with these procedures.

Tensile strength values were measured (MD and TD) in accordance with ASTM D882-97, except that film gauge was measured using ASTM D374-94 Method C, except that the micrometer calibration was performed annually with a commercially available gauge block (Starret Webber 9, JCV1&2). As reflected in Table IV, tensile values were measured at yield MD and TD, 200% MD and TD and Ultimate Tensile MD and TD.

The ACD protocol is an analytical-scale TREF (Temperature Rising Elution Fractionation) test for semi-crystalline copolymers to characterize the composition distribution (CD). A sample is dissolved in a good solvent, cooled slowly to allow crystallization on a support, and then re-dissolved and washed from the support by heating during elution. Polymer chains are fractionated by differences in their crystallization temperature in solution, which is a function of composition (and defect structure). A mass detector provides concentration vs. elution temperature data; CD characterization is obtained by applying a calibration curve (i.e., mole % comonomer vs. temperature) established using narrow-CD standards. Two in-house Visual Basic programs are used for data acquisition and analysis.

There are really two distributions provided by the ACD test:

Solubility Distribution (weight fraction vs. solubility temperature)—measured directly.

Composition Distribution (weight fraction vs. comonomer content)—obtained by applying the calibration curve to the solubility distribution.

Emphasis is usually placed on characterization of the CD. However, the solubility distribution can be of equal or greater importance when:

A calibration curve has not been established for the polymer of interest.

The MW of the sample is low, or the MWD is broad enough that a significant portion of the sample is low MW (M<20k). Under these circumstances, the reported CD is influenced by the MW-dependence of solubility. The calibration curve must be corrected for the effect of MW to give the true CD, which requires a priori knowledge of the relative influence of MW and composition on solubility for a given sample. In contrast, the solubility distribution correctly accounts for contributions from both effects, without trying to separate them.

Note that the solubility distribution should depend on solvent type and crystallization/dissolution conditions. If correctly calibrated, the CD should be independent of changes in these experimental parameters.

Composition Distribution Breadth Index (CDBI) was measured using the following instrumentation: ACD: Modified Waters 150-C for TREF (Temperature Rising Elution Fractionation) analysis (includes crystallization column, by-pass plumbing, timing and temperature controllers); Column: 75 micron glass bead packing in (High Pressure Liquid Chromotography) HPLC-type column; Coolant: Liquid Nitrogen; Software: "A-TREF" Visual Basic programs; and Detector: Polymer Laboratories ELS-1000. Run conditions for the CDBI measurements were as follows:

| GPC settings | |
|---|---|
| Mobile phase: | TCE (tetrachlororethylene) |
| Temperature: | column compartment cycles 5–115° C., injector compartment at 115° C. |
| Run time: | 1 hr 30 min |
| Equilibration time: | 10 min (before each run) |
| Flow rate: | 2.5 mL/min |
| Injection volume: | 300 µL |
| Pressure settings: | transducer adjusted to 0 when no flow, high pressure cut-off set to 30 bar |
| Temperature controller settings | |
| Initial Temperature: | 115° C. |
| Ramp 1 Temperature: | 5° C. Ramp time = 45 min Dwell time = 3 min |
| Ramp 2 Temperature: | 115° C. Ramp time = 30 min Dwell time = 0 min |

Alternative temperature controller settings if two peaks are not exhibited in a TREF measurement.

| | | | |
|---|---|---|---|
| Initial Temperature: | 115° C. | | |
| Ramp 1 Temperature: | 5° C. | Ramp time = 12 hrs | Dwell time = 3 min |
| Ramp 2 Temperature: | 115° C. | Ramp time = 12 hrs | Dwell time = 0 min |

In some case, longer ramp times may be needed to show two peaks in a TREF measurement.

| ELS settings | |
|---|---|
| Nebulizer temperature: | 120° C. |
| Evaporator temperature: | 135° C. |
| Gas flow rate: | 1.0 slm (standard liters per minute) |
| Heated transfer line temperature: | 120° C. |

Melt Index was determined according to ASTM D-1238-95. Melt index is reported in units of g/10 min, or the numerically equivalent units of dg/min.

Density (g/cm$^3$) was determined using chips cut from plaques compression molded in accordance with ASTM D-1928-96 Procedure C, aged in accordance with ASTM D618 Procedure A, and measured according to ASTM D1505-96.

In measuring the 1% Secant, the procedures in ASTM D882-97 were followed, except that the film gauge was measured according to ASTM D374-94 Method C, except that the micrometer calibration was performed annually with a commercially available gauge block (Starret Webber 9, JCV1&2).

In measuring Elmendorf Tear, the procedures in ASTM D 1922-94a were used, except that the film gauge was measured according to ASTM D374-94 Method C, except that the micrometer calibration was performed annually with a commercially available gauge block (Starret Webber 9, JCV1&2).

Dart Drop values were measured using the procedures in ASTM D1709-98 Method A, except that the film gauge was measured according to ASTM D374-94 Method C, except that the micrometer calibration was performed annually with a commercially available gauge block (Starret Webber 9, JCV1&2).

Haze was measured in accordance with ASTM D1003-97.

Gloss was measured in accordance with ASTM D2457-97.

Total Energy was measured in accordance with ASTM D4272-90.

The probe puncture energy test was conducted using an Instron Universal tester that records a continuous reading of the force (stress) and penetration (strain) curve. A 6 inch by 6 inch (15 cm by 15 cm) film specimen was securely mounted to a compression load cell to expose a test area 4 inches (10 cm) in diameter. Two HDPE slip sheets each 2 in by 2 in (5 cm×5 cm) and each approximately 0.25 mil (6.35 µm) thick were loosely placed on the test surface. A ¾ in (1.9 cm) diameter elongated matte finished stainless steel probe, traveling at a constant speed of 10 in/min (25 cm/min) was lowered into the film, and a stress/strain curve was recorded and plotted. The "puncture force" was the maximum force (lb or N) encountered. The machine was used to integrate the area under the stress/strain curve, which is indicative of the energy consumed during the penetration to rupture testing of the film, and is reported as "puncture energy" or "break energy" (in·lb or J). The probe penetration distance was not recorded in this test.

Polydispersity or molecular weight index (Mw/Mn) is calculated based on the ratio of weight average molecular weight (Mw) and number average molecular weight (Mn) by size exclusion chromatography.

The definition of Composition Distribution Breadth Index (CDBI), and the method of determining CDBI, can be found in U.S. Pat. No. 5,206,075, which is fully incorporated by reference to the extent not inconsistent with the present inventions.

Hot tack strength was measured in accordance with the following procedure. The hot tack samples were 15 mm wide specimens cut from original films. The samples were back-taped (laminated) with 2 mil PET to avoid rupture at the transition of the seal and elongation or sticking to the seal bars. A Hot Tack Tester 3000, from J&B, was employed to make the seal, using a seal bar pressure of 0.5 Mpa, and a seal time of 0.5 sec. The hot tack strength was then determined, after a cooling time of 0.4 seconds and at a peel speed of 200 mm/min.

Film gauge was measured according to ASTM D374-94 Method C, except that the micrometer calibration procedure had not been performed at stated in that method, except that the micrometer calibration was performed annually with a commercially available gauge block (Starret Webber 9, JCV 1&2).

Shrink (%) was determined in the machine direction (MD) and transverse direction (TD) as follows. A 100 mm circle is cut from the film. The machine direction is marked, and then the specimen is talced and then heated. The amount of shrinkage is measured in both MD and TD, and is reported as % MD shrinkage and % TD shrinkage.

Melting information is determined by differential scanning calorimetry and is reported as second melting data. The sample in heated at a programmed rate of 10° C./min to a temperature above its melting range. The sample is then cooled at a programmed rate of 10° C./min to a temperature below its crystallization range. The sample is then reheated (2nd melting) at a programmed rate of 10° C./min.

Example 1

A commercial scale gas phase reactor system was operated under "condensed mode" conditions over a 24-hour period to produce certain VLDPEs of this invention. Table I summarizes the reaction conditions for this 24-hour period. The measured densities of the polyethylene polymers produced over that period ranged from 0.9090 to 0.9124.

TABLE I

Reaction Conditions

| Description | Low | High | Ave |
|---|---|---|---|
| Reaction Rate (klbs/hr) | 8.8 | 11.5 | 9.9 |
| Total Catalyst Feed (lbs/hr) | 0.95 | 1.73 | 1.27 |
| Reactor Temperature (° C.) | 78.8 | 80.0 | 80.3 |
| Reactor Pressure (psig) | 252 | 268 | 259 |
| Ethylene Feed (lbs/hr) | 8375 | 10586 | 9156 |
| Hexene Feed (lbs/hr) | 851 | 1243 | 1052 |
| Hydrogen Feed (lbs/hr) | 0.1423 | 0.2546 | 0.1963 |
| C6/C2 Mole Ratio | 0.239 | 0.0249 | 0.0250 |
| C2/H4 Partial Pressure | 168 | 182 | 172 |
| C6/C2 Flow Ratio | 0.0958 | 0.1261 | 0.1146 |
| Superficial Velocity (ft/sec) | 2.00 | 2.09 | 2.05 |
| Bed Level (ft) | 35.6 | 39.6 | 37.5 |
| Mid Bed Density (lbs/ft$^3$) | 34.0 | 39.1 | 37.4 |
| Distributor Plate DP (psi) | 2.56 | 9.6 | 7.67 |
| Cycle Gas Cooler DP (psi) | 8.9 | 12.6 | 10.4 |
| Catalyst Feeder Speed (rpm) | 388 | 519 | 434 |

Example 2

A different gas phase reactor system than the system in Example 1 was operated to produce other VLDPEs of this invention. Table II below summarizes reaction conditions for two different runs, as well as properties of the resulting polymers. As reflected in Table II, the densities of the polymers were 0.9118 g/cm$^3$ and 0.9121 g/cm$^3$.

TABLE II

Reaction Conditions

| Description | Run 1 | Run 2 |
|---|---|---|
| QC Lab Data | | |
| MI (g/10 min) | 1.02 | 1.03 |
| MIR (HLMI/MI) | 16.69 | 17.13 |
| Density (g/cc) | 0.9118 | 0.9121 |
| Bulk Density (g/cc) | 0.4500 | 0.4494 |
| APS (microns) | 997 | 921 |
| COV (%) | 38.8 | 38.2 |
| PSD <250μ (%) | 1.073 | 1.232 |
| PSD <125μ (%) | 0.267 | 0.175 |
| Pan (%) | 0.042 | 0.027 |
| Fines (<125μ) (%) | 0.267 | 0.175 |
| Flow Time (sec) | 7.93 | 7.81 |
| MCL Data | | |
| Ash (ppm) | 144 | 137 |
| Zr by ICPES (ppm) | 0.5163 | 0.5187 |
| Al by ICPES (ppm) | 15.5 | 14.9 |
| Process Data | | |
| Prod Rate (k-lbs/hr) | 154 | 172 |
| Hydrogen (ppm) | 149 | 153 |
| Ethylene (mole %) | 70.1 | 70.0 |
| Hexene (mole %) | 1.70 | 1.73 |
| Butene (mole %) | 0.00 | 0.00 |
| C2 PP (psia) | 220.4 | 220.2 |
| H2/C2 Conc Ratio | 2.13 | 2.19 |
| H2/C2 Flow Ratio | 0.017 | 0.021 |
| C6/C2 Conc Ratio | 0.243 | 0.247 |
| C6/C2 Flow Ratio | 0.119 | 0.115 |
| C4/C2 Conc Ratio | 0.0000 | 0.0000 |
| C4/C2 Flow Ratio | 0.000 | 0.000 |
| Temperature (° F.) | 175.0 | 175.0 |
| Bed Weight (lbs) | 593 | 594 |
| Res Time (hrs) | 3.88 | 3.45 |
| Gas Velocity (ft/sec) | 2.25 | 2.25 |
| Plate dP ("H20) | 26.5 | 26.2 |
| Cooler dP (psig) | 0.78 | 0.78 |
| RX Pressure (psig) | 299.6 | 299.6 |
| C2 Feed (lb/hr) | 193.7 | 211.9 |

Example 2a

Table IIA is one example of the reactor conditions to produce one embodiment of a m-VLDPE of the present invention having a density of 12.28 dg/min.

TABLE IIA

| | | Grade | ECD-330 |
|---|---|---|---|
| Reactor Process Data | | | |
| Number of Hourly Data Points | | | 10 |
| PMX Database Tag and Name | | | |
| Production Rate | R1C218 | Klbs/hr | 77.2 |
| Catalyst Rate | R1Q218 | lbs/hr | 9.6 |
| Cat Productivity | RPM Calc | lb/lb | 8447 |
| Rx Temperature | R1C163 | oF | 176.0 |
| Rx Pressure | R1P177 | psig | 304.1 |
| Inlet Temperature | R1T166 | oF | 95.6 |
| Dew Point-Inlet | R1TDELTA | oF | 50.7 |
| % Condensed | R1WTPCT | wt % | 9.9 |
| Superficial Velocity | R1C944 | ft/sec | 2.49 |
| Bed Weight | R1W176 | Klbs | 140.2 |
| Bed Height | R1D174 | ft | 48.5 |
| Ethylene Part Pres | R1P486 | psia | 186.9 |
| Ethylene Conc | R1V486 | mole % | 58.64 |
| Hexene Conc | R1V482 | mole % | 1.65 |

TABLE IIA-continued

| | | Grade | ECD-330 |
|---|---|---|---|
| H2 Conc | R1A881B | ppm | 509 |
| Isopentane Conc | R1V48A | mole % | 7.19 |
| Nitrogen Conc | R1V483 | mole % | 31.80 |
| H2/C2= | R1H2C2E | ppm/mol | 8.67 |
| C6=/C2= | R1Q489 | mol/mol | 2.81 |
| Ethylene Flow | R1B100 | Klbs/hr | 67.0 |
| Hexene Flow | R1B104 | Klbs/hr | 9.73 |
| Hydrogen Flow | R1B107 | lbs/hr | 6.16 |
| Isopentane Flow | R1F317 | Klbs/hr | 225 |
| C6=/C2= Flow Ratio | R1R104 | lb/lb | 0.160 |
| H2/C2= Flow Ratio | R1R107 | lb/Klb | 0.092 |
| Rx1 Bed FBD/SBD | R1D175 | Ratio | 0.78 |
| Rx1 Lower FBD | R1P171 | lb/ft3 | 18.9 |
| Rx1 Upper FBD | R1P172 | lb/ft3 | 17.4 |
| Rx1 Avg Filter FBD | R1C171 | lb/ft3 | 17.9 |
| Rx1 Cat Pct Activity | R1Q587 | Pct | 59 |
| Rx1 IPDS Drop/hr | R1C174SP | Drop/Hr | 24.2 |
| Rx1 Bed Res. Time | R1C176 | Hours | 1.86 |
| Screw Recov. Flow | 05C306 | klb/hr | 5.01 |
| Sulzer Recov. Flow | R1F419 | lb/hr | 551 |
| Rx1 N2 Purger Wt | 05W461 | klbs | 145.7 |
| Rx1 Stm Purger Wt | 05W487 | klbs | 27.3 |
| Calc FBD w/Wt & Ht | Calc | lb/ft3 | 17.5 |
| Calc FBD/SBD | Calc | Ratio | 0.76 |
| Space Time Yield | STY | lb/hr/ft3 | 9.6 |
| Residence Time | Calc | hr-1 | 1.86 |
| Auburn Cat Prod | R1Q588 | klb/lb | 7.23 |
| Rx1 Flare Vent | R1F134 | klb/hr | 0.000 |
| Rx1 Vent to Purger | R1F180 | klb/hr | 0.000 |
| Rx1 Composite Vent | R1B135 | klb/hr | 0.000 |
| Lab Data | | | |
| Melt Index | 35LR101 | dg/min | 12.28 |
| Gradient Density | 35LR102 | g/cc | 0.9107 |
| Bulk Density | 35LR104 | lb/ft3 | 23.0 |
| APS | 35LR107 | inches | 0.043 |
| Fines (<120 mesh) | 35LR110 | wt % | 0.04 |
| Ash | 35LR105 | ppm | 105 |
| Normal Cat Prod (for 175 psia C2=) at C2PP^ 1.83. | | lb/lb | 7488 |
| Bed Weight | FBD*Bed Ht | | 143530 |
| Res Time | Bed Wt/Prod Rate | | 1.86 |

Example 3

Certain VLDPE polymer resins of the inventions herein were prepared using gas phase polymerization using metallocene catalyst systems as disclosed elsewhere herein. Blown films were formed from these polymer resins. The invention resins and blown films are identified below (in Table III) as Samples A, G, H, and I. Sample A was made in the reactor system of Example 1, Sample G was made in the reactor system of Example 2, and Sample I was made in the reactor system of Example 1. Sample A and Sample I were made from the same production run. The co-monomers used to make Samples A, G, H, and I were ethylene and hexene. Fluidized gas phase reactors were operated to produce the resulting copolymers.

The polymerizations were conducted in the continuous gas phase fluidized bed reactors described in Examples 1 and 2. The fluidized beds of those reactors were made up of polymer granules. The gaseous feed streams of ethylene and hydrogen were introduced below each reactor bed into the recycle gas line. Hexene comonomer was introduced below the reactor bed. An inert hydrocarbon (isopentane) was also introduced to each reactor in the recycle gas line, to provide additional heat capacity to the reactor recycle gases. The individual flow rates of ethylene, hydrogen and hexene comonomer were controlled to maintain fixed composition targets. The concentration of the gases were measured by an on-line gas chromatograph to ensure relatively constant composition in the recycle gas stream.

The solid catalyst was injected directly into the fluidized beds using purified nitrogen. The catalyst rates were adjusted to maintain constant production rate. The reacting beds of growing polymer particles were maintained in a fluidized state by a continuous flow of the make up feed and recycle gas through each reaction zone. To maintain constant reactor temperatures, the temperature of the recycle gas was continuously adjusted up or down to accommodate any changes in the rate of heat generation due to the polymerization.

The fluidized bed was maintained at a constant height by withdrawing a portion of the bed at a rate equal to the formation of the particulate product. The product was transferred to a purger vessel to remove entrained hydrocarbons.

Example 4

For purposes of demonstrating the surprisingly improved toughness of the VLDPEs of this invention, a variety of blown films made of polyethylene polymers made using different processes were compared. Specifically, the properties of certain "invention" polymers, i.e., those made in accordance with the gas polymerization processes corresponding to the invention, using metallocene catalysts, were compared with certain "comparative" polymers, i.e., polymers made in accordance with non-invention methods.

Referring now to the comparative examples, Sample B was made using a comparative polymer, specifically, a linear low density polyethylene (0.9189 g/cm$^3$) made using metallocene catalyst in a gas phase polymerization process. Sample C was made using a linear low density polyethylene (0.9199 g/cm$^3$) made using Ziegler-Natta catalyst in a gas phase polymerization process. Sample D was made using a plastomer (0.9031 g/cm$^3$) made using metallocene catalyst in a high pressure bulk polymerization process. Sample E was made using a very low density polyethylene (0.9132 g/cm$^3$) made using Ziegler-Natta catalyst in a solution polymerization process. Sample F was made using a very low density polyethylene (0.9104 g/cm$^3$) made using metallocene catalyst in a solution polymerization process. Sample J was made using a linear low density polyethylene (0.9178 g/cm$^3$) made using metallocene catalyst in a gas phase polymerization process. Sample K was made using a linear low density polyethylene (0.9183 g/cm$^3$) made using metallocene catalyst in a gas phase polymerization process. Sample B and Sample K are the same commercial film.

Samples A-G were evaluated together while Samples H-K were evaluated together. Due to possible slight differences during processing and during testing, there may be differences between the data of Samples A–G in comparison with the data of Samples H–K. Each of the polymers was formed into a monolayer blown film. The processing conditions for the preparation of the monolayer blown films reported in Table V are set forth in Table III below. Comparative examples of samples B–F and J–K are denoted in the table by an asterisk (*). Samples A–G were processed at a cooling air parameter of 60%, 3.5" press., 52° F. temperature. Samples H–K were processed at a cooling air parameter of 53%, 2.8" press., and 60° F. temperature.

TABLE III

Processing Conditions

| Measured Properties | A | B* | C* | D* | E* | F* | G | H | | H ave |
|---|---|---|---|---|---|---|---|---|---|---|
| Target Thickness (mil) | 1.25 | 1.25 | 1.25 | 1.25 | 1.25 | 1.25 | 1.25 | 0.8 | 1.25   3.0 | — |
| Melt Temperature (F.) | 385 | 388 | 377 | 397 | 381 | 377 | 392 | 386 | 386   386 | 386 |
| Extruder Head Press (psi) | 3520 | 3490 | 3120 | 4490 | 3220 | 3190 | 3780 | 3540 | 3470   3520 | 3510 |
| Extruder Speed (rpm) | 46.4 | 46.4 | 46.4 | 41.8 | 46.6 | 43.3 | 45.4 | 43.9 | 43.8   43.8 | 43.8 |
| Line Speed (ft/min) | 123 | 121 | 119 | 119 | 119 | 119 | 119 | 174.6 | 118.3   49.1 | — |
| Production Rate (lbs/hr) | 155 | 152 | 152 | 154 | 151 | 152 | 153 | 150 | 150   150 | 150 |
| Frost Line Height (in.) | 20 | 18 | 15 | 25 | 16 | 18 | 19 | 20 | 20   20 | 20 |
| Extruder Drive Load (%) | 55.4 | 55.7 | 49.1 | 59.6 | 47.5 | 47.6 | 56.6 | 55.8 | 55.8   55.4 | 55.7 |
| Motor Load/Prod. Rate | 0.357 | 0.366 | 0.323 | 0.387 | 0.315 | 0.313 | 0.37 | 0.372 | 0.372   0.369 | 0.371 |
| Horsepower | 13.6 | 13.7 | 12 | 13.2 | 11.7 | 10.9 | 13.6 | 13 | 13   13 | 13 |
| Prod. Rate/Horsepower | 11.38 | 11.11 | 12.63 | 11.67 | 12.86 | 13.93 | 11.21 | 3.41 | 3.41   3.41 | 3.41 |
| Torque (hp · rpm) | 0.293 | 0.295 | 0.26 | 0.316 | 0.251 | 0.252 | 0.3 | 0.295 | 0.295   0.293 | 0.294 |

| Measured Properties | I | J* | | J ave* | K* | | K ave* |
|---|---|---|---|---|---|---|---|
| Target Thickness (mil) | 1.25 | 0.8 | 1.25   3.0 | — | 0.8 | 1.25   3.0 | — |
| Melt Temperature (F.) | 387 | 391 | 391   391 | 391 | 408 | 408   407 | 407.7 |
| Extruder Head Press (psi) | 3640 | 3490 | 3270   3420 | 3393 | 3340 | 3220   3270 | 3270 |
| Extruder Speed (rpm) | 44.7 | 53.5 | 52.8   53.4 | 53.2 | 46.4 | 46.4   46.4 | 46.4 |
| Line Speed (ft/min) | 117.3 | 182.1 | 117.3   49.1 | — | 188.6 | 118.3   48.2 | — |
| Production Rate (lbs/hr) | 149 | 153 | 144   152 | 149.7 | 151 | 151   152 | 151.3 |
| Frost Line Height (in.) | 18 | 18 | 20   18 | 18.7 | 18 | 18   18 | 18 |
| Extruder Drive Load (%) | 53.4 | 45.1 | 40.2   43.1 | 42.8 | 52.4 | 51.9   52.7 | 52.3 |
| Motor Load/Prod. Rate | 0.358 | 0.295 | 0.279   0.284 | 0.286 | 0.347 | 0.344   0.347 | 0.346 |
| Horsepower | 13 | 13 | 11   12 | 12 | 13 | 13   13 | 13 |
| Prod. Rate/Horsepower | 3.32 | 2.86 | 2.72   2.83 | 2.80 | 3.25 | 3.25   3.26 | 3.25 |
| Torque (hp · rpm) | 0.283 | 0.239 | 0.213   0.228 | 0.227 | 0.278 | 0.275   0.279 | 0.277 |

The properties of each of the films were then measured. The resin densities, melt index test results, and characterization data of the films reported in Table V are set forth in Table IV below. Comparative examples of samples B–F and J–K are denoted in the table by an asterisk (*). The heat of fusion data, the heat of crystallization data and the VICAT softening point data of the resins of the present invention and plastomer sample D show the difference in crystallinity between VLDPEs of the present invention and plastomers.

TABLE IV

Resin Properties

| Measured Properties | A | B* | C* | D* | E* | F* | G | H |
|---|---|---|---|---|---|---|---|---|
| Density (g/cm³) | | | | | | | | |
| Molded | 0.9129 | 0.9189 | 0.9199 | 0.9031 | 0.9132 | 0.9104 | 0.9114 | 0.9129 |
| Rheology | | | | | | | | |
| MI (I2) | 1.07 | 1.17 | 1.10 | 1.09 | 1.00 | 0.96 | 0.97 | 1.17 |
| HLMI (I21) | 18.50 | 19.14 | 30.03 | 18.03 | 30.37 | 35.54 | 17.04 | 18.18 |
| Ratio (I21/I2) | 17.29 | 16.36 | 27.30 | 16.54 | 30.37 | 37.02 | 17.56 | 15.5 |
| MI Swell | 1.12 | 1.08 | 1.17 | 1.01 | 1.14 | 1.23 | 1.10 | 1.13 |
| Hexene Content | | | | | | | | |
| Wt % | 9.6 | 7.1 | | | | | 10.2 | 10.4 |

TABLE IV-continued

Resin Properties

| GPC-HT | | | | | | | | |
|---|---|---|---|---|---|---|---|---|
| Mn | 50612 | 48653 | | | | | 52016 | 45411 |
| Mw | 100908 | 100064 | | | | | 102647 | 101795 |
| Mw/Mn | 1.99 | 2.06 | | | | | 1.97 | 2.24 |
| Mz/Mw | 1.66 | 1.69 | | | | | 1.61 | 1.73 |
| Mz + 1/Mw | 2.46 | 2.52 | | | | | 2.29 | 2.66 |
| ACD | | | | | | | | |
| CDBI | 64.5 | 6.7 | | | | | 55.3 | 71.8 |
| % Solubles | 0.6 | 0.6 | | | | | 1.1 | 1.2 |
| DSC (Celsius) | | | | | | | | |
| $2^{nd}$ melt-Peak | 118.34 | 120.70 | 124.56 | | 118.00 | 105.68 | 117.83 | 116.50 |
| $2^{nd}$ peak | 103.41 | 109.62 | | 99.64 | 123.25 | | 101.72 | 100.81 |
| $3^{rd}$ peak | | | | | 103.62 | | | |
| Delta H (J/g) | 112.06 | 126.96 | 128.45 | 94.76 | 112.45 | 108.61 | 109.84 | 113.44 |
| Crystallization-Peak | | | | | | | | 102.37 |
| $2^{nd}$ peak | | | | | | | | 89.42 |
| $3^{rd}$ peak | | | | | | | | 60.58 |
| Delta H (J/g) | −118.11 | −129.63 | −130.28 | −96.17 | −114.28 | −114.41 | −112.19 | −121.36 |
| VICAT 1000 g (C) | 100.1 | 107.7 | 102.5 | 90.3 | 94.6 | 96.1 | 98.4 | 98.98 |
| Tear-Intrinsic (g/mil) | 346 | 351 | 460 | 237 | 546 | 433 | 327 | 354 |

| Measured Properties | I | J* | K* |
|---|---|---|---|
| Density (g/cm³) | | | |
| Molded | 0.9130 | 0.9178 | 0.9183 |
| Rheology | | | |
| MI (I2) | 1.07 | 1.14 | 1.12 |
| HLMI (I21) | 17.39 | 18.13 | 17.41 |
| Ratio (I21/I2) | 16.3 | 15.9 | 15.6 |
| MI Swell | 1.13 | 1.12 | 1.13 |
| Hexene Content | | | |
| Wt % | 10.0 | 8.2 | 7.2 |
| GPC-HT | | | |
| Mn | 44528 | 44050 | 46928 |
| Mw | 103827 | 103123 | 103842 |
| Mw/Mn | 2.33 | 2.34 | 2.21 |
| Mz/Mw | 1.75 | 1.74 | 1.73 |
| Mz + 1/Mw | 2.71 | 2.65 | 2.66 |
| ACD | | | |
| CDBI | 66.4 | 62.5 | 72.7 |
| % Solubles | 1.2 | 1.7 | 2.3 |
| DSC (Celsius) | | | |
| $2^{nd}$ melt-Peak | 116.07 | 119.37 | 118.03 |
| $2^{nd}$ peak | 100.43 | 106.36 | 107.76 |
| $3^{rd}$ peak | | | |
| Delta H (J/g) | 122.44 | 131.67 | 132.32 |
| Crystallization-Peak | 102.76 | 105.33 | 103.27 |
| $2^{nd}$ peak | 89.96 | 94.87 | 94.51 |
| $3^{rd}$ peak | 61.33 | 64.74 | 66.16 |
| Delta H (J/g) | −122.46 | −132.01 | −130.65 |
| VICAT 1000 g (C) | 100.2 | 105.6 | 107.6 |
| Tear-Intrinsic (g/mil) | 341 | 369 | 355 |

The films made of invention polymers (Samples A, G, H, and I) were tested in accordance with the test procedures discussed above. The same properties of the comparative films, made of polymers made using non-invention processes, were also measured, to demonstrate certain improved properties resulting from the invention. The results of these measurements are shown in Table V, below. Comparative examples of samples B–F and J–K are denoted in the table by an asterisk (*).

The films made of invention polymers showed a remarkable improvement over comparative polymers in Dart Drop values, which measure the energy that causes a polymer film to fail under specified conditions of impact of a free-falling dart. As reflected in Table V, Dart Drop values utilizing method A on 1.25 mil target gauge films for Samples A, G, H, and I were 1176 g/mil, 1,314 g/mil, 1122 g/mil, and 1104 g/mil respectively. These Dart Drop values were over 50% greater than the Dart Drop values for all the films made of polymers made using solution polymerization processes. That is, Dart Drop for Sample E (a film made of an LDPE made using Ziegler-Natta catalyst in a solution polymerization process) was 325 g/mil, and Dart Drop for Sample F (a film made of a VLDPE made using metallocene catalyst in a solution polymerization process) was 491 g/mil. The Dart Drop values of the film made of invention polymers were also greater than the Dart Drop values for films made of polymers made using other gas phase polymerization processes. For Sample B (a film made of an LDPE made using metallocene catalyst in a gas phase polymerization process), the Dart Drop value was 590 g/mil. For Sample C (a film made of an LDPE made using Ziegler-Natta catalyst in a gas phase polymerization process), the Dart Drop value was 112 g/mil. For Sample J (a film made of a LLDPE using metallocene catalyst in a gas phase polymerization process), the Dart Drop value was 744 g/mil for a 1.25 target gauge film. For Sample K (a film made of a LLDPE using metallocene catalyst in a gas phase polymerization process), the Dart Drop value was 634 g/mil for a 1.25 target gauge film. The invention polymers of Samples H and I also showed improved Dart Drop values over target gauges of 0.8 mil in comparison to Samples J and K.

The invention polymers also showed improvement in Puncture properties, which reflect the resistance of a stretch wrap film to the penetration of a probe. As reflected in Table V, for Samples A, G, H, and I, Puncture Peak Force values for 1.25 mil target gauge films were 11.55 lb/mil, 9.96 lb/mil, 10.2 lb/mil, 9.7 lb/mil respectively, and Puncture Break Energy values were 40.40 in-lb/mil, 32.52 in-lb/mil, 37.9 in-lb/mil, 32.2 in-lb/mil, respectively. For Sample E (a film made of an LLDPE made using Ziegler-Natta catalyst in a solution polymerization process), the Peak Force was 10.02 lb/mil, and the Puncture Break Energy was 34.33 in-lb/mil. For Sample F (a film made of a VLDPE made using metallocene catalyst in a solution polymerization process), the Peak Force was 10.70 lb/mil, and the Puncture Break Energy was 35.29 in-lb/mil. For Sample B (a film made of an LDPE made using metallocene catalyst in a gas phase polymerization process), the Peak Force was 9.98 lb/mil and the Puncture Break Energy 31.25 in-lb/mil. For Sample C (a film made of LDPE made using Ziegler-Natta catalyst in a gas phase polymerization process) the Peak Force was 8.13 lb/mil and the Puncture Break Energy was 23.46 in-lb/mil. For Sample J (a film made of a LLDPE using metallocene catalyst in a gas phase polymerization process) for a 1.25 target gauge film, the Peak Force was 7.4 lb/mil and the Puncture Break Energy was 20.5 in-lb/mil. For Sample K (a film made of a LLDPE using metallocene catalyst in a gas phase polymerization process) for a 1.25 target gauge film, the Peak Force was 8.3 lb/mil and the Puncture Break Energy was 23.3 in-lb/mil.

The films of the present invention also showed a higher Total Energy Impact Strength at −29° F. As reflected in Table V, for Samples A, G, H, and I, the Total Energy Impact Strength values at −29° F. for 1.25 mil target gauge films were 3.01 ft-lb, 3.07 ft-lb, 3.028 ft-lb, and 3.905 ft-lb respectively. These values were greater than the values for all the comparative films made of polymers made using solution polymerization processes. For Sample E (a film made of an LLDPE made using Ziegler-Natta catalyst in a solution polymerization process), the total energy impact strength value at −29° F. was 2.42 ft-lb. For Sample F (a film made of a VLDPE made using metallocene catalyst in a solution polymerization process), the total energy impact strength value at −29° F. was 1.86 ft-lb. The total energy impact strength values at −29° F. were greater than the values of polymers made using other gas phase polymerization processes. For Sample B (a film made of an LDPE made using metallocene catalyst in a gas phase polymerization process), the total energy impact strength value at −29° F. was 2.34 ft-lb. For Sample C (a film made of LDPE made using Ziegler-Natta catalyst in a gas phase polymerization process), the total energy impact strength value at −29° F. was 1.79 ft-lb. For Sample J (a film made of a LLDPE using metallocene catalyst in a gas phase polymerization process) for a 1.25 target gauge film, the total energy impact strength value at −29° F. was 1.956 ft-lb. For Sample K (a film made of a LLDPE using metallocene catalyst in a gas phase polymerization process) for a 1.25 target gauge film, the total energy impact strength value at −29° F. was 2.156. The invention polymers of Samples H and I showed improved total energy impact strength value at −290 F. over target gauges of 0.8 mil in comparison to Samples J and K.

In addition, the films of the present invention show higher ultimate tensile strengths in comparison to conventional Ziegler-Natta polyethylenes Sample C and Sample E. The films of the present invention also show less shrinkage in comparison to conventional Ziegler-Natta polyethylenes Sample C and Sample E.

TABLE V

Film Properties

| Measured Properties | A | B* | C* | D* | E* | F* | G |
|---|---|---|---|---|---|---|---|
| Target Thickness (mil) | 1.25 | 1.25 | 1.25 | 1.25 | 1.25 | 1.25 | 1.25 |
| Tensile @ Yield MD (psi) | 1,078 | 1,335 | 1,447 | 738 | 1,087 | 934 | 1,054 |
| Tensile @ Yield TD (psi) | 1,080 | 1,397 | 1,618 | 713 | 1,118 | 921 | 1,050 |
| Tensile at 200% MD (psi) | 1,911 | 1,901 | 1,905 | 1,812 | 2,269 | 2,684 | 1,897 |
| Ultimate Tensile MD (psi) | 11,232 | 10,550 | 8,603 | 10,579 | 9,586 | 9,218 | 11,598 |
| Ultimate Tensile TD (psi) | 9,197 | 8,012 | 6,240 | 10,778 | 6,748 | 8,597 | 9,463 |
| Elongation @ Yield MD (%) | 6.8 | 6.2 | 5.9 | 8.8 | 6.5 | 7.3 | 6.9 |
| Elongation @ Yield TD (%) | 6.7 | 6.2 | 5.9 | 8.0 | 6.2 | 6.5 | 6.8 |
| Break Elongation MD (%) | 474 | 518 | 545 | 439 | 446 | 458 | 480 |
| Break Elongation TD (%) | 617 | 627 | 740 | 592 | 711 | 736 | 618 |
| 1% Secant Modulus MD (psi) | 25,300 | 36,270 | 37,330 | 14,630 | 27,360 | 22,520 | 25,080 |
| 1% Secant Modulus TD (psi) | 27,500 | 39,380 | 47,020 | 17,030 | 30,480 | 23,330 | 26,780 |
| Elmendorf TearMD (g/mil) | 202 | 247 | 225 | 159 | 352 | 133 | 178 |
| Elmendorf TearTD (g/mil) | 396 | 439 | 764 | 362 | 696 | 475 | 392 |
| Elmendorf TearMD (g/mil) | | | | | | | |
| Elmendorf TearTD (g/mil) | | | | | | | |
| Dart Drop Method A (g) | 1376 | 714 | 145 | 1,612 | 406 | 624 | 1,682 |
| Dart Drop Method A (g/mil) | 1176 | 590 | 112 | 1,250 | 325 | 491 | 1,314 |
| Dart Drop Method B (g) | | | | | | | |
| Dart Drop Method B (g/mil) | | | | | | | |

TABLE V-continued

| Gauge (mil) | | | | | | | |
|---|---|---|---|---|---|---|---|
| Average | 1.24 | 1.22 | 1.29 | 1.29 | 1.25 | 1.27 | 1.28 |
| Low | 1.10 | 1.13 | 1.15 | 1.09 | 1.15 | 1.19 | 1.14 |
| High | 1.34 | 1.31 | 1.40 | 1.52 | 1.34 | 1.36 | 1.38 |
| Haze (%) | 7.7 | 17.7 | 14.3 | 1.0 | 6.9 | 3.3 | 9.3 |
| Gloss 45 degree | 58 | 44 | 51 | 92 | 70 | 76 | 58 |
| Reblock (I/I) | 191 | 47 | 208 | 178 | 197 | 212 | >214 |
| Puncture Peak Force (lb) | 14.32 | 12.17 | 10.48 | 14.19 | 12.53 | 13.58 | 12.75 |
| Puncture Peak Force (lb/mil) | 11.55 | 9.98 | 8.13 | 11.00 | 10.02 | 10.70 | 9.96 |
| Break Energy (in-lb) | 50.09 | 38.13 | 30.26 | 48.09 | 42.92 | 44.82 | 41.66 |
| Break Energy (in-lb/mil) | 40.40 | 31.25 | 23.46 | 37.28 | 34.33 | 35.29 | 32.54 |
| Total Energy @ - 29 Degrees F. (ft/lb) | 3.01 | 2.34 | 1.79 | 2.85 | 2.42 | 1.86 | 3.07 |
| Total Energy @ - room temperature (ft/lb) | > Capacity | 4.57 | 1.80 | > Capacity | 2.73 | 4.61 | >Capacity |
| Shrink MD (%) | 42 | 45 | 61 | 46 | 72 | 79 | 46 |
| Shrink TD (%) | −4 | −4 | −14 | −8 | −23 | −10 | −9 |

| Measured Properties | H | | | I | | | J* | | |
|---|---|---|---|---|---|---|---|---|---|
| Target Thickness (mil) | 0.8 | 1.25 | 3.0 | 1.25 | 0.8 | 1.25 | 3.0 | | |
| Tensile @ Yield MD (psi) | 1,090 | 1,084 | 972 | 1,007 | 1,156 | 1,235 | 1,202 | | |
| Tensile @ Yield TD (psi) | 1,037 | 1,065 | 1,054 | 1,020 | 1,225 | 1,166 | 1,276 | | |
| Tensile at 200% MD (psi) | | | | | | | | | |
| Ultimate Tensile MD (psi) | 7.7 | 8.4 | 5.6 | 6.3 | 6.0 | 6.3 | 5.4 | | |
| Ultimate Tensile TD (psi) | 6.7 | 7.4 | 6.4 | 5.8 | 5.1 | 4.4 | 5.9 | | |
| Elongation @ Yield MD (%) | 12,185 | 11,282 | 9,266 | 11,007 | 10,411 | 11,333 | 8,802 | | |
| Elongation @ Yield TD (%) | 8,922 | 9,358 | 8,664 | 8,150 | 8,593 | 8,933 | 8,284 | | |
| Break Elongation MD (%) | 466 | 509 | 614 | 494 | 432 | 539 | 666 | | |
| Break Elongation TD (%) | 581 | 627 | 666 | 610 | 641 | 659 | 702 | | |
| 1% Secant Modulus MD (psi) | 18,666 | 21,733 | 23,849 | 22,417 | 28,151 | 28,340 | 29,418 | | |
| 1% Secant Modulus TD (psi) | 22,033 | 23,403 | 24,478 | 24,175 | 39,630 | 36,070 | 32,231 | | |
| Elmendorf Tear MD (g) | 167 | 322 | 848 | 350 | 177 | 332 | 1011 | | |
| Elmendorf Tear TD (g) | 304 | 493 | 1029 | 520 | 405 | 569 | 1210 | | |
| Elmendorf TearMD (g/mil) | 204 | 246 | 272 | 265 | 213 | 261 | 317 | | |
| Elmendorf TearTD (g/mil) | 358 | 385 | 334 | 403 | 488 | 448 | 381 | | |
| Dart Drop Method A (g) | 932 | 1448 | > Test Max. | 1424 | 650 | 967 | > Test Max | | |
| Dart Drop Method A (g/mil) | 1226 | 1122 | > Test Max. | 1104 | 765 | 744 | > Test Max | | |
| Dart Drop Method B (g) | | | 2140 | | | | 1888 | | |
| Dart Drop Method B (g/mil) | | | 697 | | | | 601 | | |
| Gauge (mil) | | | | | | | | | |
| Average | 0.76 | 1.29 | 3.07 | 1.29 | 0.85 | 1.30 | 3.14 | | |
| Low | 0.70 | 1.20 | 2.87 | 1.22 | 0.78 | 1.23 | 2.97 | | |
| High | 0.85 | 1.42 | 3.36 | 1.38 | 0.88 | 1.45 | 3.35 | | |
| Haze (%) | 13.0 | 13.8 | 15.4 | 11.7 | 19.0 | 20.3 | 26.3 | | |
| Gloss 45 degree | 63 | 62 | 59 | 47 | 43 | 32 | 37 | | |
| (I/I) | 152.76 | 187.9 | >214.0 | 172.7 | 34.7 | 61.22 | 140.46 | | |
| Puncture Peak Force (lb) | 9.1 | 13.2 | 22.1 | 12.5 | 7.6 | 9.6 | 21.1 | | |
| Puncture Peak Force (lb/mil) | 12.0 | 10.2 | 7.2 | 9.7 | 8.9 | 7.4 | 6.7 | | |
| Break Energy (in-lb) | 32.1 | 48.9 | 68.2 | 41.5 | 23.0 | 26.6 | 53.9 | | |
| Break Energy (in-lb/mil) | 42.2 | 37.9 | 22.2 | 32.2 | 27.0 | 20.5 | 17.2 | | |
| Total Energy @ - room temperature (ft/lb) | >5.69 | >5.69 | >5.69 | >5.69 | >5.69 | >5.69 | >5.69 | | |
| Total Energy @ - 29 Degrees F. (ft/lb) | 1.922 | 3.028 | >5.69 | 3.905 | 1.150 | 1.956 | >5.69 | | |
| Shrink MD (%) | 52 | 36 | 28 | 45 | 54 | 46 | 30 | | |
| Shrink TD (%) | −7 | −5 | −1 | −6 | −8 | −7 | 0 | | |

| Measured Properties | K* | | |
|---|---|---|---|
| Target Thickness (mil) | 0.8 | 1.25 | 3.0 |
| Tensile @ Yield MD (psi) | 1,297 | 1,253 | 1,193 |
| Tensile @ Yield TD (psi) | 1,415 | 1,346 | 1,358 |
| Tensile at 200% MD (psi) | | | |
| Ultimate Tensile MD (psi) | 5.9 | 5.5 | 4.8 |
| Ultimate Tensile TD (psi) | 7.0 | 6.2 | 5.8 |
| Elongation @ Yield MD (%) | 10,972 | 10,781 | 8,467 |
| Elongation @ Yield TD (%) | 8,612 | 8,671 | 7,994 |
| Break Elongation MD (%) | 442 | 565 | 657 |
| Break Elongation TD (%) | 652 | 664 | 709 |
| 1% Secant Modulus MD (psi) | 25,042 | 25,910 | 31,436 |
| 1% Secant Modulus TD (psi) | 33,946 | 31,688 | 31,830 |
| Elmendorf Tear MD (g) | 230 | 318 | 998 |
| Elmendorf Tear TD (g) | 375 | 554 | 1158 |

TABLE V-continued

| | | | |
|---|---:|---:|---:|
| Elmendorf TearMD (g/mil) | 274 | 247 | 318 |
| Elmendorf TearTD (g/mil) | 457 | 440 | 371 |
| Dart Drop Method A (g) | 511 | 831 | > Test Max. |
| Dart Drop Method A (g/mil) | 608 | 634 | > Test Max. |
| Dart Drop Method B (g) | | | 1375 |
| Dart Drop Method B (g/mil) | | | 439 |
| Gauge (mil) | | | |
| Average | 0.84 | 1.31 | 3.13 |
| Low | 0.78 | 1.24 | 2.99 |
| High | 0.91 | 1.41 | 3.24 |
| Haze (%) | 19.2 | 23.7 | 26.2 |
| Gloss 45 degree | 38 | 37 | 41 |
| (I/I) | 44.74 | 65.48 | 110.18 |
| Puncture Peak Force (lb) | 7.7 | 10.9 | 22.1 |
| Puncture Peak Force (lb/mil) | 9.2 | 8.3 | 7.1 |
| Break Energy (in-lb) | 23.2 | 30.5 | 61.8 |
| Break Energy (in-lb/mil) | 27.6 | 23.3 | 19.7 |
| Total Energy @ - room temperature (ft/lb) | 4,320 | 5.415 | >5.69 |
| Total Energy @ - 29 Degrees F. (ft/lb) | 1,258 | 2.156 | 5.312 |
| Shrink MD (%) | 52 | 42 | 29 |
| Shrink TD (%) | -5 | -3 | 0 |

Example 5

Another improved property exhibited by the invention VLDPEs is superior Hot Tack strength at low initiation temperatures, an important property for films. The Samples A–K discussed above were subjected to the Hot Tack test, the results of which are shown in Table VI below. Comparative examples of Samples B–F and J–K are denoted in the table by an asterisk (*). At a temperature of 100 C, the Hot Tack strength (N/15 mm) for 1.25 target gauge films was 6.56 for Sample A; 0.38 for Sample B; 0.28 for Sample C; 6.50 for Sample D; 2.35 for Sample E; 3.38 for Sample F; 6.90 for Sample G, 8.70 for Sample H, 7.77 for Sample I, 3.21 for Sample J, and 0.69 for Sample K. Thus, it was demonstrated that Samples A, G, H, and I performed substantially better than the other samples in the Hot Tack tests. The Hot Tack results for the films of the present invention are unexpected and surprising. It is believed that as the density of the sample decreases, the peak Hot Tack strength increases and moves to a lower temperature. It is surprising that the Hot Tack properties of the plastomer Sample C and the films of the present invention are approximately the same even though the density of Sample C is lower than the films of the present invention.

TABLE VI

Hot Tack Strength (N/15 mm)

| Target Gauge | A 1.25 mil | B* 1.25 mil | C* 1.25 mil | D* 1.25 mil | E* 1.25 mil | F* 1.25 mil | G 1.25 mil |
|---|---:|---:|---:|---:|---:|---:|---:|
| 85° C. | 0.19 | | | | | | 0.28 |
| 90° C. | 0.55 | | | 0.19 | 0.23 | | 1.01 |
| 95° C. | 1.68 | | | 2.09 | 1.15 | 0.58 | 1.93 |
| 100° C. | 6.56 | 0.38 | 0.28 | 6.50 | 2.35 | 3.38 | 6.90 |
| 105° C. | 5.98 | 1.42 | 1.38 | 5.95 | 5.01 | 6.01 | 6.39 |
| 110° C. | 5.31 | 4.86 | 2.56 | 5.52 | 5.21 | 5.42 | 5.39 |
| 115° C. | | 4.07 | 4.11 | 4.94 | 4.69 | 4.11 | 4.08 |
| 120° C. | | 3.47 | 3.74 | 3.90 | 3.97 | | |
| 125° C. | | | 2.79 | | | | |

| | H | | | I | J* | | | K* | | |
|---|---|---|---|---|---|---|---|---|---|---|
| Gauge (mil) | 0.8 mil | 1.25 mil | 3.0 mil | 1.25 mil | 0.8 mil | 1.25 mil | 3.0 mil | 0.8 mil | 1.25 mil | 3.0 mil |
| 80° C. | 0.15 | 0.14 | 0.51 | 0.94 | 0.30 | 0.10 | 0.21 | | | 0.00 |
| 85° C. | 0.50 | 1.22 | 0.29 | 0.44 | 0.18 | 0.09 | 0.30 | | | 0.11 |
| 90° C. | 2.19 | 2.25 | 1.33 | 1.25 | 0.20 | 0.13 | 0.10 | 0.12 | | 0.25 |
| 95° C. | 7.55 | 8.30 | 2.71 | 5.67 | 0.87 | 0.70 | 0.17 | 0.33 | 0.14 | 0.53 |
| 100° C. | 8.80 | 8.70 | 10.35 | 7.77 | 5.22 | 3.21 | 1.00 | 0.97 | 0.69 | 1.60 |
| 105° C. | 6.57 | 7.02 | 10.19 | 6.56 | 4.97 | 5.51 | 3.69 | 5.19 | 5.61 | 7.32 |
| 110° C. | 4.93 | 4.68 | 9.95 | 5.13 | 4.60 | 5.39 | 8.62 | 4.24 | 5.61 | 6.11 |
| 115° C. | 4.75 | 4.89 | 8.52 | 4.39 | 3.95 | 4.18 | 10.74 | 4.05 | 4.72 | 5.80 |
| 120° C. | 3.61 | 4.47 | 7.68 | 4.05 | 3.64 | 4.49 | 9.46 | 3.65 | 3.97 | 5.13 |
| 125° C. | 3.45 | 3.74 | 4.88 | 3.92 | 3.28 | 3.76 | 6.65 | 3.48 | 3.93 | 4.95 |
| 130° C. | 2.96 | 3.32 | 4.11 | 3.57 | 3.12 | 3.55 | 4.92 | 3.62 | 3.67 | 4.41 |
| 135° C. | 2.60 | 2.87 | 3.89 | 3.37 | 2.78 | 3.24 | 4.19 | 3.41 | 3.39 | 4.02 |
| 140° C. | 2.33 | 2.83 | 3.59 | 3.11 | 2.35 | 3.29 | 3.94 | 3.00 | 3.27 | 3.50 |

In addition, Samples A–K discussed above were subjected to a Heat Seal test. The Heat Seal strengths (lbs) results are shown in Table VII below. Comparative examples of Samples B–F and J–K are denoted in the table by an asterisk (*). Seal conditions include a 1 inch seal width, a seal pressure of 73 psi, a seal time of 1.0 sec, and a peal speed of 20 in/min.

TABLE VII

Heat Seal Strengths (lbs)

| Target | A | B* | C* | D* | E* | F* | G | H | | | I |
|---|---|---|---|---|---|---|---|---|---|---|---|
| Gauge | 1.25 mil | 0.8 mil | 1.25 mil | 3.0 mil | 1.25 mil | 0.8 mil | 1.25 mil | 0.8 mil | 1.25 mil | 3.0 mil | 1.25 mil |
| 80° C. | | | | | | | | 0.11 | 0.00 | 0.00 | 0.00 |
| 85° C. | | | | 0.66 | | | 1.17 | 0.11 | 0.11 | 0.09 | 0.00 |
| 90° C. | 1.55 | | 0.14 | 1.33 | 0.13 | 0.85 | 1.80 | 1.16 | 1.54 | 1.04 | 1.60 |
| 95° C. | 1.84 | | 0.19 | 1.80 | 1.65 | 1.48 | 2.00 | 1.34 | 1.91 | 3.88 | 1.87 |
| 100° C. | 2.03 | 0.14 | 0.38 | 2.08 | 1.95 | 2.14 | 2.07 | 1.46 | 2.10 | 4.31 | 2.21 |
| 105° C. | 2.21 | 2.08 | 0.48 | 2.15 | 2.20 | 3.04 | 2.17 | 1.60 | 2.19 | 4.54 | 2.32 |
| 110° C. | 2.27 | 2.30 | 1.86 | 2.06 | 2.40 | 3.37 | 2.23 | 1.60 | 2.31 | 4.80 | 2.37 |
| 115° C. | 2.38 | 2.34 | 2.69 | 1.96 | 2.60 | 3.06 | 2.33 | 1.62 | 2.35 | 4.87 | 2.48 |
| 120° C. | 2.33 | 2.43 | 2.77 | 2.02 | 2.80 | 3.03 | 2.28 | 1.63 | 2.30 | 5.10 | 2.52 |
| 125° C. | 2.35 | 2.42 | 2.64 | 2.20 | 2.44 | 3.14 | 2.29 | 1.66 | 2.19 | 5.32 | 2.40 |
| 130° C. | 2.35 | 2.40 | 2.68 | 2.13 | 2.61 | 2.90 | 2.35 | 1.71 | 2.28 | 5.76 | 2.34 |
| 135° C. | | | 2.91 | | | | | | | | |
| 140° C. | | | | | | | | 1.72 | 2.30 | 5.72 | 2.43 |

| Target | J* | | | K* | | |
|---|---|---|---|---|---|---|
| Gauge | 0.8 mil | 1.25 mil | 3.0 mil | 0.8 mil | 1.25 mil | 3.0 mil |
| 80° C. | | | | | | |
| 85° C. | | | | | | |
| 90° C. | 0.00 | 0.00 | | | | |
| 95° C. | 0.12 | 0.12 | 0.00 | 0.00 | 0.00 | |
| 100° C. | 1.41 | 2.08 | 0.16 | 0.17 | 0.22 | 0.00 |
| 105° C. | 1.58 | 2.22 | 4.41 | 1.55 | 2.21 | 0.13 |
| 110° C. | 1.73 | 2.42 | 5.07 | 1.68 | 2.37 | 0.97 |
| 115° C. | 1.80 | 2.55 | 5.23 | 1.76 | 2.55 | 5.18 |
| 120° C. | 1.78 | 2.57 | 5.34 | 1.74 | 2.61 | 5.29 |
| 125° C. | 1.79 | 2.44 | 5.61 | 1.72 | 2.48 | 5.64 |
| 130° C. | 1.75 | 2.47 | 5.98 | 1.72 | 2.56 | 5.92 |
| 135° C. | | | | | | |
| 140° C. | 1.70 | 2.41 | 6.67 | 1.77 | 2.48 | 6.52 |

Example 6

To assure compliance with the FDA hexane extractable limit of 2.6% for hot food, extractables testing was conducted on Samples H–K discussed above. Extractables testing was also conducted on Sample L and Sample M. Sample L and Sample M comprise VLDPE polymer resin and blown films prepared using a process of the invention, i.e., gas phase polymerization using a metallocene catalyst system. Sample L and Sample M were made in the reactor system of Example 1. The results of the Extractable testing are shown in Table VIII below. Comparative examples of Samples J–K are denoted in the table by an asterisk (*).

TABLE VIII

Hexene Extractable Results

| | H | I | J* | K* | L | M |
|---|---|---|---|---|---|---|
| Density | 0.9129 | 0.9130 | 0.9178 | 0.9183 | 0.912 | 0.912 |
| MI, dg/min (I2) | 1.17 | 1.07 | 1.138 | 1.117 | 3.5 | 12 |
| Hexene Content | 10.4 | 10.0 | 8.2 | 7.2 | | |
| Film | 3.3 | 3.4 | 3.6 | 3.4 | 3.5 | 3.8 |

TABLE VIII-continued

Hexene Extractable Results

| | H | I | J* | K* | L | M |
|---|---|---|---|---|---|---|
| Thickness (mil) | | | | | | |
| % Hexane Extract | 0.36 | 0.43 | 0.33 | 0.64 | 0.70 | 0.98 |

Example 7

Oxygen Transmission Rate, Carbon Dioxide Transmission Rate, and Water Vapor Transmission Rate testing were conducted on 1.25 target gauge films of Samples A–K discussed above. Table IX below shows the results of the Oxygen Transmission Rate testing. Comparative examples of Samples B–C and J–K are denoted in the table by an asterisk (*).

TABLE IX

Oxygen Transmission Rate (cc * mil/100 in$^2$ * day * atmO$_2$)

|  | A | B* | C* | D* | E* | F* | G | H | I | J* | K* |
|---|---|---|---|---|---|---|---|---|---|---|---|
| Test 1 A (cc * mil/100 in$^2$ * day * atmO$_2$) | 566 | 721 | 545 | 833 | 723 | 675 | | | | | |
| Test 1 B (cc * mil/100 in$^2$ * day * atmO$_2$) | 551 | 686 | 546 | 837 | 709 | 662 | | | | | |
| Test 2 A (cc * mil/100 in$^2$ * day * atmO$_2$) | 498 | 438 | 534 | 591 | 561 | 596 | | 464 | 491 | 406 | 420 |
| Test 2 B (cc * mil/100 in$^2$ * day * atmO$_2$) | 449 | 422 | 472 | 680 | 525 | 561 | | 451 | 498 | 412 | 406 |
| Test 2 Gauge (mil) | 1.24 | 1.22 | 1.29 | 1.29 | 1.25 | 1.27 | | 1.29 | 1.29 | 1.30 | 1.31 |
| Test 1 OTR (cc * mil/100 in$^2$ * day * atmO$_2$) | 693 | 858 | 704 | 1077 | 895 | 849 | | | | | |
| Test 2 OTR (cc * mil/100 in$^2$ * day * atmO$_2$) | 587 | 525 | 649 | 820 | 679 | 735 | | 590 | 638 | 532 | 541 |
| Delta/Test 2 (%) | 18.0 | 63.6 | 8.4 | 31.4 | 31.9 | 15.6 | | | | | |

Table X shows the results of the Carbon Dioxide Transmission Rate testing. Comparative examples of Samples B–C and J–K are denoted in the table by an asterisk (*).

TABLE X

Carbon Dioxide Transmission Rate (cc * mil/100 in$^2$ * day * atm CO$_2$)

|  | A | B* | C* | D* | E* | F* |
|---|---|---|---|---|---|---|
| CO2 TR Test A (cc * mil/100 in$^2$ * day * atm CO$_2$) | 2998 | 2687 | 2787 | 4435 | 3921 | 3253 |
| CO2 TR Test B (cc * mil/100 in$^2$ * day * atm CO$_2$) | 3151 | 2725 | 2791 | 4319 | 3788 | 3277 |
| Film Gauge (mil) | 1.24 | 1.22 | 1.29 | 1.29 | 1.25 | 1.27 |
| CO2TR (cc * mil/100 in$^2$ * day * atm CO$_2$) | 3812 | 3301 | 3598 | 5646 | 4818 | 4147 |

|  | G | H | I | J* | K* |
|---|---|---|---|---|---|
| CO2 TR Test A | | 2766 | 2762 | 2707 | 2252 |
| CO2 TR Test B | | 2808 | 2719 | 2668 | 2279 |
| Film Gauge | | 1.29 | 1.29 | 1.30 | 1.31 |
| CO2TR | | 3595 | 3535 | 3494 | 2968 |

Table XI shows the results of the Water Vapor Transmission Rate testing. Comparative examples of Samples B–F and J–K are denoted in the table by an asterisk (*).

TABLE XI

Water Vapor Transmission Rate (g * mil/100 in$^2$ * day)

|  | A | B* | C* | D* | E* | F* | G | H | I | J* | K* |
|---|---|---|---|---|---|---|---|---|---|---|---|
| Test 1A (g * mil/100 in$^2$ * day) | 1.44 | 1.39 | 1.46 | 2.23 | 1.75 | 1.77 | 1.55 | | | | |
| Test 1B (g * mil/100 in$^2$ * day) | 1.48 | 1.22 | 1.51 | 2.03 | 1.77 | 1.72 | 1.63 | | | | |
| Test 2A (g * mil/100 in$^2$ * day) | 1.41 | 1.20 | 1.37 | 2.00 | 1.63 | 1.63 | 1.54 | | | | |
| Test 2B (g * mil/100 in$^2$ * day) | 1.40 | 1.22 | 1.39 | 1.92 | 1.64 | 1.64 | 1.51 | | | | |
| Ave-Test 1 (g * mil/100 in$^2$ * day) | 1.46 | 1.31 | 1.49 | 2.13 | 1.76 | 1.75 | 1.59 | | | | |
| Ave-Test 2 (g * mil/100 in$^2$ * day) | 1.41 | 1.21 | 1.38 | 1.96 | 1.64 | 1.64 | 1.53 | 1.41 | 1.39 | 1.31 | 1.18 |
| (A-2)−(A-) | −0.06 | −0.10 | −0.11 | −0.17 | −0.13 | −0.11 | −0.06 | | | | |
| Delta/A-1 (%) | −3.8 | −7.3 | −7.1 | −8.0 | −7.1 | −6.3 | −4.1 | | | | |

Example 8

As reflected in Table XII, below, the Dart Drop of films made of invention polymers were also substantially higher than the Dart Drop of films made of higher density polymers made from a gas phase polymerization process using metfilms made from invention VLDPEs were compared to unheated films made using non-invention LDPEs. Samples "AA" and "BB" were both non-invention films, made from polyethylenes having a density of 0.917 g/cm$^3$ and a melt index of 3.5 g/10 min. Sample "AA" had a thickness of 1.54 mil average gauge, while Sample "BB" had a thickness of 0.85 mil average gauge. Comparative examples of Samples AA and BB are denoted in the table by an asterisk (*). Samples "CC" and "DD" were invention films, made from a VLDPE. Sample "CC," made of a VLDPE with a melt index of 3.5 g/10 min and density of 0.912 g/cm$^3$, had an average gauge thickness of 1.49 mils, and Sample "DD," made of a VLDPE with a melt index of 3.5 g/10m min and a density of 0.912 g/cm$^3$, had an average gauge thickness of 0.81 mils. Both the invention and non-invention polymers were made using a gas phase polymerization process with a metallocene catalyst system. The data show that, even though the invention VLDPEs had lower density than the non-invention LDPEs, the Dart Drop toughness of the invention VLDPE films were higher than the Dart Drop toughness of the non-invention LDPE films. Specifically, average Dart Drop (in g/mil) for invention Samples "CC" and "DD" was over 40% greater than average Dart Drop for non-invention Samples "AA" and "BB."

TABLE XII

Film Properties

| | Sample Property | | | |
|---|---|---|---|---|
| | AA* | BB* | CC | DD |
| Dart Drop | | | | |
| (g) | 964 | 610 | 1,338 | 826 |
| (g/mil) | 626 | 717 | 898 | 1,020 |
| Gauge (mil) | | | | |
| Average | 1.49 | 0.81 | 1.54 | 0.85 |
| Low | 1.50 | 0.81 | 1.43 | 0.77 |
| High | 1.56 | 0.88 | 1.54 | 0.85 |
| Puncture | | | | |
| Peak Force (lb) | 16.00 | 10.82 | 15.75 | 11.03 |
| Peak Force (lb/mil) | 10.39 | 12.73 | 10.57 | 13.61 |

TABLE XII-continued

Film Properties

| | Sample Property | | | |
|---|---|---|---|---|
| | AA* | BB* | CC | DD |
| Break Energy (in-lb) | 58.20 | 38.31 | 59.37 | 38.62 |
| Break Energy (in-lb/mil) | 37.79 | 45.07 | 39.85 | 47.68 |

Example 9

In this example, multilayer blown coextruded films were produced. A Three-layer Film A1 was produced which comprised a top layer and a bottom layer (i.e. skins) of a LLDPE film (EXCEED™ ECD-312, 0.917 g/cm$^3$; MI 1.0) made using a metallocene catalyst in a gas phase polymerization process. The middle layer (i.e. core) comprised a linear low density polyethylene (ExxonMobil LL3105, 0.921 g/cm$^3$) made using a Ziegler-Natta catalyst. A Three-layer Film B1 was produced which comprised a top layer and a bottom layer of a LLDPE film (EXCEED™ ECD-312, 0.917 g/cm$^3$; MI 1.0) made using a metallocene catalyst in a gas phase polymerization process. The middle layer comprised a linear low density polyethylene (ExxonMobil LL3201, 0.925 g/cm$^3$) made using a Ziegler-Natta catalyst. A Three-layer Film C1 was produced which comprised a top layer and a bottom layer of a LLDPE film (EXCEED™ ECD-312, 0.917 g/cm$^3$; MI 1.0) made using a metallocene catalyst in a gas phase polymerization process. The middle layer comprised super strength hexene (NTX-101 polymer, 0.9 MI). A Three-layer Film D1 of the present invention was produced which comprised a top layer and a bottom layer of a VLDPE film (EXCEED™ ECD-321, 0.912 g/cm$^3$; MI 1.0) made using a metallocene catalyst in a gas phase polymerization process. The middle layer comprised a linear low density polyethylene (ExxonMobil LL3105, 0.921 g/cm$^3$) made using a Ziegler-Natta catalyst.

Table XIII, below, shows the properties of the Three-layer Films A1–D1 at various thickness ratios. Comparative examples of Samples A1–C1 are denoted in the table by an asterisk (*). For example, the thickness ratio of 20/60/20 refers to the top, middle, and bottom layers respectively.

TABLE XIII

| Film Properties | A1* | A1* | B1* | B1* | C1* | C1* | C1* | C1* | D1 | D1 |
|---|---|---|---|---|---|---|---|---|---|---|
| Film Layer Compositions | 20/60/20 | 20/60/20 | 20/60/20 | 20/60/20 | 20/60/20 | 20/60/20 | 35/30/35 | 35/30/35 | 20/60/20 | 20/60/20 |
| Target Gauge (mil) | 3.00 | 5.00 | 3.00 | 5.00 | 3.00 | 5.00 | 3.00 | 5.00 | 3.00 | 5.00 |
| Gauge-Ave (mil) | 3.06 | 5.03 | 3.03 | 5.02 | 3.06 | 5.01 | 2.96 | 4.90 | 3.07 | 5.04 |
| Gauge-Max (mil) | 2.77 | 4.56 | 2.83 | 4.73 | 2.95 | 4.69 | 2.80 | 4.64 | 2.73 | 4.65 |
| Gauge-Min (mil) | 3.32 | 5.26 | 3.28 | 5.30 | 3.19 | 5.17 | 3.09 | 5.18 | 3.33 | 5.35 |
| 1% Secant modulus-MD (psi) | 31881 | 32797 | 36087 | 37015 | 27858 | 28458 | 27179 | 28120 | 29160 | 28380 |
| 1% Secant modulus-TD (psi) | 34988 | 34648 | 38579 | 39054 | 29745 | 30039 | 27741 | 28670 | 30326 | 31093 |
| MD tensile at Yield (psi) | 1471 | 1493 | 1557 | 1550 | 1335 | 1335 | 1335 | 1343 | 1361 | 1352 |
| TD tensile at Yield (psi) | 1563 | 1546 | 1689 | 1677 | 1393 | 1369 | 1369 | 1369 | 1446 | 1442 |
| 200% MD (psi) | 1697 | 1658 | 1733 | 1705 | 1569 | 1545 | 1607 | 1574 | 1617 | 1576 |
| Ultimate-MD (psi) | 7124 | 6399 | 7094 | 6225 | 6724 | 5923 | 6876 | 6143 | 8111 | 6854 |
| Ultimate-TD (psi) | 6500 | 5982 | 6261 | 5718 | 6148 | 5643 | 6437 | 6122 | 6888 | 6153 |
| Elongation at Yield-MD (%) | 6 | 7 | 6 | 6 | 6 | 6 | 6 | 6 | 6 | 7 |
| Elongation at Yield TD (%) | 6 | 6 | 6 | 6 | 6 | 6 | 6 | 6 | 6 | 6 |

TABLE XIII-continued

| Film Properties | A1* | A1* | B1* | B1* | C1* | C1* | C1* | C1* | D1 | D1 |
|---|---|---|---|---|---|---|---|---|---|---|
| Break Elongation-MD (%) | 661 | 700 | 674 | 703 | 667 | 687 | 641 | 658 | 665 | 684 |
| Break Elongation at TD (%) | 664 | 688 | 656 | 675 | 662 | 677 | 635 | 667 | 641 | 656 |
| Puncture Peak Force (lb) | 22.94 | 32.24 | 23.09 | 33.51 | 22.06 | 30.90 | 22.74 | 32.14 | 22.43 | 32.01 |
| Puncture Break Energy (in-lb) | 52.57 | 71.54 | 53.46 | 78.29 | 54.54 | 73.00 | 54.59 | 70.19 | 65.39 | 83.19 |
| Puncture Peak Force (lb/mil) | 7.50 | 6.41 | 7.62 | 6.68 | 7.21 | 6.17 | 7.68 | 6.56 | 7.31 | 6.35 |
| Puncture Break Energy (in-lb/mil) | 17.18 | 14.22 | 17.64 | 15.60 | 17.82 | 14.57 | 18.44 | 14.32 | 21.30 | 16.51 |
| Tear-Elmendorf-MD (g) | 1518 | 2730 | 1432 | 2717 | 1586 | 2730 | 1328 | 2269 | 1341 | 2400 |
| Tear-Elmendorf-TD (g) | 1475 | 2746 | 1562 | 2797 | 1851 | 2989 | 1557 | 2576 | 1755 | 2653 |
| Tear-Elmendorf-MD per mil (g/mil) | 496 | 553 | 477 | 550 | 525 | 549 | 449 | 467 | 479 | 501 |
| Tear-Elmendorf-TD per mil (g/mil) | 502 | 549 | 528 | 569 | 607 | 598 | 524 | 526 | 566 | 541 |
| Shrink-MD (%) | 40 | 33 | 31 | 25 | 30 | 22 | 31 | 22 | 41 | 34 |
| Shrink-TD (%) | 0 | 0 | 4 | 3 | 3 | 3 | 3 | 3 | 2 | 1 |
| Heat Seal Window | 110 C. to 135 C. | 120 C. to 135 C. | — | — | — | — | — | — | 85 C. to 135 C. | 95 C. to 135 C. |

Table XIV, below, shows the Heat Seal performance of the Three-layer Films A1 and D1 and a Monolayer Film F1 at target overall film gauges of 3 mils and 5 mils. Three-layer Films A1 and D1 comprised the films discussed above. Monolayer Film F1 comprised a LLDPE film (0.925 g/cm$^3$; MI 0.8) made using a Ziegler-Natta catalyst. Comparative examples of Samples A1 and F1 are denoted in the table by an asterisk (*).

TABLE XIV

Heat Seal (Peak Load lbs)

| | A1* | D1 | F1* | A1* | D1 | F1* |
|---|---|---|---|---|---|---|
| Film Layer Compositions | 20/60/20 | 20/60/20 | | 20/60/20 | 20/60/20 | |
| Target Gauge (mil) | 3.00 | 3.00 | 3.00 | 5.00 | 5.00 | 5.00 |
| Temp (° C.) | | | | | | |
| 80 | | | | | | |
| 85 | | 0.10 | | | | |
| 90 | | 3.83 | | | 0.13 | |
| 95 | | 4.79 | | | 1.96 | |
| 100 | | 4.88 | 0.13 | | 7.77 | 0.13 |
| 105 | | 4.94 | 0.14 | | 7.76 | 0.18 |
| 110 | 0.06 | 5.09 | 0.22 | | 7.91 | 0.17 |
| 115 | 4.88 | 5.23 | 0.29 | 0.16 | 7.96 | 0.19 |
| 120 | 5.24 | 5.48 | 1.25 | 0.79 | 8.35 | 0.25 |
| 125 | 5.66 | 5.65 | 3.48 | 8.32 | 8.64 | 0.36 |
| 130 | 6.00 | 6.07 | 6.14 | 8.51 | 8.62 | 0.88 |
| 135 | 6.32 | | 6.21 | 8.74 | 8.55 | 1.14 |
| 140 | | | 6.44 | 9.44 | 8.73 | 2.12 |
| 145 | | | 6.5 | 9.41 | 8.69 | 7.49 |
| 150 | | | 6.11 | | | 9.78 |
| 155 | | | 6.2 | | | 9.94 |
| 160 | | | | | | 10.38 |
| 165 | | | | | | 11.43 |
| 170 | | | | | | 11.57 |
| 175 | | | | | | 11.27 |

TABLE XV

Hot Tack Performance (N/15 mm)

| | A1* | D1 | F1* | A1* | D1 | F1* | G1* |
|---|---|---|---|---|---|---|---|
| Film Layer Compositions | 20/60/20 | 20/60/20 | | 20/60/20 | 20/60/20 | | |
| Target Gauge (mil) | 3 | 3 | 3 | 5 | 5 | 5 | 5 |
| Temp (° C.) | | | | | | | |
| 95 | | 0.20 | | | 0.36 | | |
| 100 | 0.04 | 2.29 | | | 3.02 | | |
| 105 | 0.55 | 9.68 | | | 5.80 | | 0.17 |
| 110 | 2.98 | 9.97 | | 0.05 | 12.46 | | 1.32 |
| 115 | 8.42 | 9.95 | | 0.93 | 14.59 | | 7.57 |
| 120 | 9.10 | 10.79 | | 3.19 | 15.02 | | 7.37 |
| 125 | 6.46 | 11.85 | 2.3 | 6.15 | 15.07 | | 4.92 |
| 130 | 5.55 | 4.35 | 3.6 | 9.75 | 9.40 | | 3.65 |
| 135 | | 1.68 | 3.8 | 9.54 | 8.01 | | |
| 140 | | | 3.8 | 6.43 | | | |
| 145 | | | 3.9 | | | 1.9 | |
| 150 | | | 3 | | | 2.5 | |
| 155 | | | | | | 3.5 | |
| 160 | | | | | | 4 | |
| 165 | | | | | | 3.6 | |
| 170 | | | | | | 3.6 | |
| 175 | | | | | | | |
| 180 | | | | | | | |

Example 10

Table XV, below, shows the Heat Tack performance of the Three-layer Films A1 and D1 and Monolayer Films F1 and G1 at target overall film gauges of 3 mils and 5 mils. Three-layer Films A1 and D1 and Monolayer Film F1 comprised the films discussed above. Monolayer G1 comprised a LLDPE (0.9189 g/cm$^3$) made using metallocene catalyst in a gas phase polymerization process. Comparative examples of Samples A1, F1, and G1 are denoted in the table by an asterisk (*).

In this example, three-layer coextruded blown films were produced comprising a middle layer of a linear low density polyethylene (NTX, 0.917 g/cm$^3$) made using a Ziegler-Natta catalyst. Three-layer Film A2 comprised a top layer and a bottom layer of LDPE (0.923 g/cm$^3$) having 3.5% ethylene vinyl acetate comonomer. Three-layer Film B2 comprised a top layer and a bottom layer of a blend comprising 30% of LDPE (0.923 g/cm$^3$) having 3.5% ethylene vinyl acetate comonomer and 70% of NTX-095.

Three-layer Film C2 comprised a top and a bottom layer of a blend comprising 30% of LDPE (0.923 g/cm³) having 3.5% ethylene vinyl acetate comonomer and 70% of a linear low density polyethylene (EXCEED™ 350D65, 0.918 g/cm³) made using metallocene catalyst in a gas phase polymerization process. Three-layer Film D2 comprised a top and a bottom layer of a linear low density polyethylene (0.918 g/cm³, M.I. 1.0 dg/min) made using metallocene catalyst in a gas phase polymerization process. Three-layer Film E2 comprised a top and a bottom layer of a VLDPE film (0.912 g/cm³; MI 1.0) of the present invention. The layer ratios were 20/60/20 with overall target gauge films of 1.75 mils. Table XVI, below, shows the properties and processing parameters of the Three-layer Films A2–E2. Comparative examples of Samples A2–D2 are denoted in the table by an asterisk (*).

In comparison between Film E2 with Film A2, the mVLDPE material as a skin layer (i.e. as a top and bottom layer) performed better than the EVA skin. There were a two-fold improvement in MD tear and a four-fold improvement in dart impact strength. Tensile strength also increased significantly. EVAs are known for their cold temperature properties. Unexpectedly, the mVLDPE outperformed the EVA as shown by Total Energy at −29 Degrees F. The mVLDPE structure gave a film with twice the hot tack strength of the EVA film at a 10–15° C. lower temperature. The ultimate seal strength of the two structures were about the same, but with a decrease in the seal initiation temperature (SIT) of 10–15° C. for the mVLDPE.

In comparison between Film E2 with Film D2, it can be seen that Film E2 showed an improvement in the dart drop strength. In addition, E2 showed a 15–20° C. improvement in the seal initiation temperature and a significant increase in the hot tack strength.

TABLE XVI

| | A2* | B2* | C2* | D2* | E2 |
|---|---|---|---|---|---|
| Film Properties | | | | | |
| Tensile @ Yield (psi) MD | 1,363 | 1,358 | 1,406 | 1,354 | 1,298 |
| Tensile @ Yield (psi) TD | 1,355 | 1,540 | 1,422 | 1,383 | 1,224 |
| Ultimate Tensile (psi) MD | 4,346 | 6,582 | 6,452 | 7,746 | 8,600 |
| Ultimate Tensile (psi) TD | 4,977 | 5,966 | 6,264 | 6,434 | 6,882 |
| Break Elongation (%) MD | 502 | 603 | 610 | 631 | 639 |
| Break Elongation (%) TD | 637 | 695 | 692 | 648 | 615 |
| 1% Secant MD (psi) | 23,957 | 27,663 | 26,809 | 26,382 | 24,606 |
| 1% Secant TD (psi) | 26,548 | 31,531 | 29,466 | 26,103 | 25,950 |
| Elmendorf Tear MD (g/mil) | 199 | 244 | 251 | 480 | 440 |
| Elmendorf Tear TD (g/mil) | 523 | 709 | 615 | 628 | 638 |
| Dart Drop (method A) (g/mil) | 202 | 165 | 251 | 458 | 852 |
| Actual Gauge (mil) (ave) | 1.63 | 1.65 | 1.74 | 1.77 | 1.74 |
| Haze (%) | 7.8 | 11.3 | 7.7 | 9.8 | 5.7 |
| Gloss 45 degree | 70 | 65 | 76 | 74 | 80 |
| Reblock (l/l) | 54 | 35 | 21 | 14 | >214 |
| Puncture Peak Force (lb/mil) | 4.62 | 5.38 | 5.63 | 6.54 | 5.65 |
| Puncture Break Energy (in-lb-mil) | 7.20 | 10.08 | 10.69 | 16.01 | 12.82 |
| Total Energy Dart Drop at 29 Degrees F. (ft-lb) | 1.57 | 1.35 | 1.62 | 2.45 | 2.62 |
| Total Energy Dart Drop at Room Temperature (ft-lb) | 2.12 | 2.12 | 2.3 | 5.6 | > capacity |
| OTR (cc * mil/100 sq in/day) | 492 | 436 | 481 | 571 | 484 |
| WVTR (gm * mil/100 sq in/day | 1.76 | 1.70 | 1.43 | 1.61 | 1.50 |
| Processing | | | | | |
| Core Extruder (3.5") | | | | | |
| Melt Temp deg F. | 429 | 429 | 433 | 433 | 430 |
| Head Pressure, psi | 4502 | 4715 | 4792 | 4860 | 4686 |
| RPM | 29 | 29 | 30 | 30 | 29 |
| Amp Load | 106 | 104 | 106 | 106 | 105 |
| Skin Extruder (2.5") | | | | | |
| Melt Temp deg F. | 368 | 390 | 402 | 412 | 400 |
| Head Pressure, psi | 2077 | 3285 | 3614 | 3624 | 3121 |
| RPM | 47 | 48 | 48 | 48 | 45 |
| Amp Load | 27 | 38 | 43 | 46 | 46 |

Table XVII shows the heat seal strength and Table XVIII shows the hot tack strength of the Three-layer Films A2–E2. Comparative examples of Samples A2–D2 are denoted in the table by an asterisk (*).

TABLE XVII

Heat Sealing (lbs.) - Co-extruded Structures

| Temperature, ° C. | A2* | B2* | C2* | D2* | E2 |
|---|---|---|---|---|---|
| 75 | 0.04 | — | — | — | 0.23 |
| 80 | 0.25 | 0.11 | — | — | 2.51 |
| 85 | 0.9 | 0.22 | — | — | 2.66 |
| 90 | 1.92 | 0.44 | 0.1 | 0.09 | 2.81 |
| 95 | 2.81 | 2.59 | 0.92 | 2.64 | 2.83 |
| 100 | 3.15 | 3 | 3.18 | 2.68 | 2.93 |
| 105 | 3.13 | 3.06 | 3.46 | 2.94 | 2.83 |
| 110 | 3.12 | 3.35 | 3.71 | 3.22 | 2.82 |
| 115 | 2.88 | 3.58 | 3.76 | 3.51 | 2.58 |
| 120 | 2.99 | 3.7 | 3.31 | — | — |
| 125 | 2.8 | 3.3 | — | — | — |

TABLE XVIII

Hot Tack (Newtons) - Co-extruded Structures

| Temperature, °C. | A2* | B2* | C2* | D2* | E2 |
|---|---|---|---|---|---|
| 85 | — | — | — | — | 0.04 |
| 90 | — | — | — | — | 0.1 |
| 95 | | | | | 2.64 |
| 100 | — | 0.04 | — | — | 5.44 |
| 105 | 0.19 | 0.14 | 0.17 | 0.06 | 9.8 |
| 110 | 0.64 | 0.91 | 0.57 | 1.26 | 9.06 |
| 115 | 4.11 | 1.68 | 5.06 | 6.4 | 7.5 |
| 120 | 4.76 | 3.21 | 6.73 | 6.1 | — |
| 125 | 4.57 | 4.89 | 5.43 | 5.58 | — |
| 130 | 4.11 | 4.1 | 4.68 | 4.51 | — |
| 135 | 2.8 | 3.3 | — | — | — |

Example 11

In this example, three-layer coextruded films comprising skin layers of metallocene PE polymers were compared to skin layers of ethylene vinyl acetate copolymers all without slip or antiblock. Each three-layer film comprised a middle layer of a LLDPE (nominal 0.9 MI, 0.917 g/cm$^3$). The target layer ratio of each three-layer film was a 20/60/20 structure. The overall target film gauge was 1.75 mils. Sample A3 comprised a three-layer film having skins comprising a linear low density polyethylene (0.9199 g/cm$^3$) made using metallocene catalyst in a gas phase polymerization process. Sample B3 comprised a three-layer film having skins comprising a linear low density polyethylene (0.9128 g/cm$^3$) made using metallocene catalyst in a gas phase polymerization process. Sample C3 comprised a three-layer film having skins comprising a very low density polyethylene (0.9121 g/cm$^3$) of the present invention made using metallocene catalyst in a gas phase polymerization process. Sample D3 comprised a three-layer film having skins comprising an ethylene vinyl acetate copolymer (0.9263 g/cm$^3$) having 4.7 wt. % vinyl acetate comonomer content. Sample E3 comprised a three-layer film having skins comprising an ethylene vinyl acetate copolymer (0.9261 g/cm$^3$) having 5.9 wt. % vinyl acetate comonomer content. Sample F3 comprised a three-layer film having skins comprising an ethylene vinyl acetate copolymer (0.9321 g/cm$^3$) having 9.0 wt. % vinyl acetate comonomer content. Film properties are summarized in Table XIX. Film processing parameters are summarized in Table XX. Comparative examples of Samples A3–B3 and Samples D3–F3 are denoted in the table by an asterisk (*).

In comparison of Samples A3–C3, the three-layer film of Sample C3 comprising skin layers made of the VLDPE of the present invention showed improved physical strength properties (tensile, tear, and dart) in comparison to the skin layers made of the metallocene produced LLDPEs of Samples A3 and B3. In addition, the stiffness (secant modulus) and tensile yield of Sample C3 comprising VLDPE skin layers of the present invention were lower in comparison to Samples A3 and B3 comprising LLDPE skin layer. Furthermore, the three-layer film of Sample C3 comprising VLDPE skin layers of the present invention showed improved optical properties (haze and gloss) and an increase in blocking of the films in comparison to Samples A3 and B3 comprising the LLDPE skin layers.

In comparison to Samples C3–F3, the three-layer film of Sample C3 comprising skin layers made of the VLDPE of the present invention showed improved physical strength properties (tensile, tear, and dart) in comparison to the skin layers made of the ethylene vinyl acetate of Samples D3–F3. Sample C3 comprising VLDPE skin layers of the present invention also had lower blocking tendencies than Samples D3–F3 comprising the ethylene vinyl acetate skin layers. Sample C3 comprising VLDPE skin layers of the present invention had optical properties (haze and gloss) comparable to Samples D3 and E3 comprising 5%–6% ethylene vinyl acetate skin layers; however, the single data point indicates that Sample C3 comprising VLDPE skin layers of the present invention may be defensive in haze to Sample F3 comprising barefoot 9% ethylene vinyl acetate skin layers.

TABLE XIX

Comparison of Films with mPE and EVA Skin Layers (Barefoot)

| | A3* | B3* | C3 | D4* | E4* | F4* |
|---|---|---|---|---|---|---|
| Core Layer | NTX-107 | NTX-107 | NTX-107 | NTX-107 | NTX-107 | NTX-107 |
| Skin Layer | Exceed 350D60 | ECD-320 | ECD-321 | LD 312.09 | LD 306.09 | LD 318.92 |
| Gauge, mils | 1.64 | 1.70 | 1.73 | 1.74 | 1.73 | 1.72 |
| Dart Drop (A), g/mil | 495 | 755 | 820 | 248 | 339 | 345 |
| Elmendorf Tear, g/mil | | | | | | |
| MD | 429 | 408 | 401 | 188 | 220 | 234 |
| TD | 529 | 547 | 555 | 454 | 447 | 476 |
| Tensile Strength, psi | | | | | | |
| MD | 7560 | 8185 | 8616 | 4777 | 5191 | 5685 |
| TD | 6688 | 6982 | 6835 | 4910 | 5406 | 5176 |
| Elongation, % | | | | | | |
| MD | 622 | 645 | 653 | 531 | 568 | 608 |
| TD | 6896 | 661 | 654 | 683 | 712 | 705 |
| Tensile Yield, psi | | | | | | |
| MD | 1301 | 1217 | 1179 | 1246 | 1186 | 1120 |
| TD | 1322 | 1243 | 1201 | 1227 | 1181 | 1167 |
| 1% Secant Modulus, psi | | | | | | |
| MD | 26455 | 23706 | 22542 | 23270 | 22199 | 21003 |
| TD | 27761 | 24652 | 23476 | 25259 | 23112 | 22345 |

TABLE XIX-continued

Comparison of Films with mPE and EVA Skin Layers (Barefoot)

| | A3* | B3* | C3 | D4* | E4* | F4* |
|---|---|---|---|---|---|---|
| Puncture Force, lb/mil | 7.17 | 7.28 | 6.62 | 5.03 | 4.55 | 4.58 |
| Puncture Break Energy, in.lb/mil | 18.00 | 19.53 | 16.95 | 8.00 | 7.14 | 7.77 |
| Total Energy Dart Drop, ft.lb | | | | | | |
| @ −29° F. | 2.14 | 2.56 | 2.59 | 1.80 | 2.19 | 2.24 |
| @ 73° F. | 5.01 | >5 | >5 | 3.11 | 3.16 | 3.49 |
| Haze, % | 7.9 | 5.7 | 5.2 | 5.9 | 5.4 | 4.5 |
| 45 deg Gloss | 73 | 78 | 81 | 77 | 77 | 80 |
| Reblock, g | 35 | 137 | 180 | 195 | >214 | >214 |

TABLE XX

Extrusion Processing Parameters

| | A3* | B3* | C3 | D3* | E3* | F3* |
|---|---|---|---|---|---|---|
| Core Layer | NTX-107 | NTX-107 | NTX-107 | NTX-107 | NTX-107 | NTX-107 |
| Skin Layer | Exceed 350D60 | ECD-320 | ECD-321 | LD 312.09 | LD 306.09 | LD 318.92 |
| 3½" Core Extruder: | | | | | | |
| Melt Temp, deg F. | 446 | 446 | 447 | 445 | 445 | 445 |
| Head Press, psi | 4180 | 4280 | 4290 | 4240 | 4240 | 4180 |
| RPM | 30 | 30 | 30 | 29 | 29 | 29 |
| Horsepower | 22 | 23 | 23 | 22 | 22 | 22 |
| Rate, lbs/hr | 188 | 190 | 189 | 183 | 189 | 190 |
| 2½" Core Extruder: | | | | | | |
| Melt Temp, deg F. | 408 | 403 | 399 | 354 | 352 | 352 |
| Head Press, psi | 3350 | 3430 | 3330 | 2380 | 1850 | 1880 |
| RPM | 52 | 49 | 49 | 54 | 52 | 52 |
| Horsepower | 14 | 14 | 14 | 9 | 8 | 8 |
| Rate, lbs/hr | 126 | 127 | 128 | 126 | 126 | 129 |

Hot Tack results and Heat Sealing strengths of Samples A3–F3 are summarized in Table XXI and Table XXII, respectively. Comparative examples of Samples A3–B3 and Samples D3–F3 are denoted in the table by an asterisk (*).

In terms of sealing, there was a significant shift in both hot tack and sealing both to lower temperatures and stronger tacking strength for Sample C3 comprising skin layers made of VLDPE of the present invention in comparison to Samples A3 and B3 comprising skin layers made of LLDPE. Sample C3 comprising skin layers made of the VLDPE of the present invention also generally had higher hot tack strength and a peak strength at a lower temperature than Samples D3–F3 comprising skin layers made of ethylene vinyl acetate. The data shows that as the density of the metallocene catalyzed polyethylenes drop in the skin layers of the three-layer films, the hot tacking temperature goes down and the hot tack strength goes up while higher levels of vinyl acetate in the skin layers of the three-layer films yields a decrease in hot tacking temperature and a decrease in strength. Sample C3 comprising skin layers made of the VLDPE of the present invention had heat seal initiation temperatures about 2–7° C. lower than Sample D3–F3 comprising skin layers made of ethylene vinyl acetate.

TABLE XXI

Hot Tack (N/15 mm)

| Temp. (° C.) | A3* | B3* | C3 | D3* | E3* | F3* |
|---|---|---|---|---|---|---|
| 75 | | | 0.09 | | | |
| 80 | | | 0.10 | | | |
| 85 | | 0.14 | 0.87 | | | |
| 90 | | 2.22 | 3.52 | 0.18 | 0.12 | 0.32 |
| 95 | 0.11 | 4.27 | 10.68 | 0.25 | 0.73 | 0.95 |
| 100 | 0.48 | 9.13 | 12.23 | 1.02 | 1.75 | 2.48 |
| 105 | 6.97 | 8.13 | 8.96 | 3.59 | 2.48 | 3.16 |
| 110 | 6.75 | 8.07 | 7.17 | 7.47 | 3.82 | 4.88 |
| 115 | 5.00 | | | 6.76 | 4.11 | 3.71 |
| 120 | 4.88 | | | 4.72 | 4.23 | 3.61 |
| 125 | | | | | 4.09 | |
| 130 | | | | | 4.10 | |
| 135 | | | | | 2.01 | |

TABLE XXII

Heat Seals (lbs)

| Sample ID | A3* | B3* | C3 | D3* | E3* | F3* |
|---|---|---|---|---|---|---|
| Skin Layer | 350D60 | ECD 320 | ECD 321 | LD 312.09 | LD 306.09 | LD 318.92 |
| Core NTX107 | | | | | | |
| Temperature (C.) | | | | | | |
| 85 | | | 0.08 | | 0.12 | 0.29 |
| 90 | | 0.10 | 1.84 | 0.17 | 0.51 | 0.81 |
| 95 | | 2.42 | 2.40 | 1.08 | 1.15 | 1.47 |
| 100 | | 2.53 | 2.66 | 1.73 | 2.28 | 2.31 |
| 105 | 0.13 | 2.71 | 2.75 | 2.51 | 3.06 | 2.84 |
| 110 | 2.73 | 2.77 | 2.78 | 3.66 | 3.30 | 2.97 |
| 115 | 2.78 | 2.83 | 2.97 | 3.61 | 3.32 | 3.12 |
| 120 | 3.14 | 3.08 | 2.98 | 3.48 | 3.45 | 3.00 |
| 125 | 3.14 | 3.11 | 2.95 | 3.65 | 3.29 | 3.04 |
| 130 | 3.24 | 3.14 | 3.03 | 3.72 | 3.30 | 3.16 |
| 135 | 3.12 | 2.93 | 3.04 | 3.87 | 3.29 | 3.08 |
| 140 | 2.97 | 2.95 | 2.96 | 3.63 | 3.33 | 3.33 |
| 145 | 3.21 | 2.99 | 3.18 | 3.65 | 3.05 | 3.03 |
| 150 | 3.11 | 2.92 | 2.90 | 3.65 | 3.29 | 3.24 |
| 155 | 3.28 | 2.85 | 2.82 | 3.38 | 3.01 | 3.12 |
| 160 | 2.82 | 3.18 | 3.09 | 3.63 | 3.00 | 3.13 |
| 165 | 3.11 | 2.93 | 2.58 | 3.47 | 3.09 | 2.98 |
| 170 | 2.74 | 2.75 | 2.90 | 3.27 | 3.13 | 3.00 |
| 175 | 2.79 | 2.65 | 2.79 | 2.79 | 3.28 | 2.87 |
| 180 | | | | 3.57 | 3.37 | 3.07 |
| 185 | | | | 3.55 | 3.07 | 3.23 |

Example 12

In this example, three-layer coextruded films comprising skin layers of metallocene PE polymers were compared to skin layers of ethylene vinyl acetate copolymers all containing slip and antiblock. Each three-layer film comprised a middle layer of a LLDPE (nominal 0.9 MI, 0.917 g/cm³). The target layer ratio of the three-layer film was a 20/60/20 structure. The overall target film gauge was 1.75 mils.

Sample A4 comprised a three-layer film having skins comprising a linear low density polyethylene (0.9199 g/cm³) made using metallocene catalyst in a gas phase polymerization process and comprising 2% EXCEED™-Master Batch-1 and 1.25% EXCEED™-Master Batch-2 which supplied about 2500 ppm antiblock talc (Talc; ABT-2500) and about 500 ppm slip for the entire film. Sample B4 comprised a three-layer film having skins comprising a very low density polyethylene (0.9121 g/cm³) of the present invention made using metallocene catalyst in a gas phase polymerization process and comprising 2% EXCEED™-Master Batch-1 and 1.25% EXCEED™-Master Batch-2 which supplied about 2500 ppm antiblock (Talc; ABT-2500) and about 500 ppm slip for the entire film. Sample C4 comprised a three-layer film having skins comprising a very low density polyethylene (0.9121 g/cm³) of the present invention made using metallocene catalyst in a gas phase polymerization process and comprising 2% EXCEED™-Master Batch-1 and 2.25% EXCEED™-Master Batch-2 which supplied about 5000 ppm antiblock (Talc; ABT-2500) and about 500 ppm slip for the entire film. Sample D4 comprised a three-layer film having skins comprising an ethylene vinyl acetate copolymer (0.9254 g/cm³) having 3.5 wt. % vinyl acetate comonomer content and containing 2500 ppm antiblock (diatomaceous earth) and 500 ppm slip. Film properties are summarized in Table XXIII. Comparative examples of Samples A4 and D4 are denoted in the table by an asterisk (*).

At the same nominal additive loading, Sample B4 comprising VLDPE skin layers of the present invention was slightly defensive in reblock and COF properties but with a slight improvement in optical properties to that of Sample D4 comprising ethylene vinyl acetate skin layers. Sample C4 comprising VLDPE skin layers of the present invention and having a doubling of the antiblock loading had better blocking and COF properties while still maintaining a slight optical advantage in comparison to Sample D3 comprising ethylene acetate skin layers. The exact level of antiblock that would be used in a particular application is dependent on the final application and requirements.

TABLE XXIII

Comparison of Films with mPE and EVA Skin Layers

| | Sample | | | |
|---|---|---|---|---|
| | A4* | B4 | C4 | D4* |
| Core Layer | NTX-107 | NTX-107 | NTX-107 | NTX-107 |
| Skin Layer: | | | | |
| Resin | Exceed 350D60 | ECD-321 | ECD-321 | LD302.32 |
| ECD-MB-1, % | 2 | 2 | 2 | — |
| ECD-MB-2, % | 1.25 | 1.25 | 2.5 | — |
| Actual Gauge, mils | 1.60 | 1.67 | 1.75 | 1.66 |
| Haze, % | 8.7 | 5.8 | 7.3 | 8.3 |
| Gloss, 45 deg | 74 | 81 | 77 | 69 |
| Reblock, g | 6 | 42 | 8 | 24 |
| COF, kinetic (in/in) | 0.10 | 0.15 | 0.08 | 0.11 |
| COF, static (in/in) | 0.12 | 0.19 | 0.10 | 0.14 |

Example 13

In this example, three-layer coextruded films comprising skin layers of metallocene PE polymers were compared to skin layers of ethylene vinyl acetate copolymers all containing slip and antiblock. Each three-layer film comprised a middle layer of a LLDPE (nominal 0.9 MI, 0.917 g/cm³). The target layer ratio of the film was a 20/60/20 structure. The overall target film gauge was 1.75 mils.

Sample A5 comprised a three-layer film having skins comprising a linear low density polyethylene (0.9199 g/cm³) made using metallocene catalyst in a gas phase polymerization process and comprising 2.8% EXCEED™-Master Batch-1 and 1.15% EXCEED™-Master Batch-2 which supplied about 2300 ppm antiblock (Talc; ABT-2500) and about 1400 ppm slip for the entire film. Sample B5 comprised a three-layer film having skins comprising a very low density polyethylene (0.9121 g/cm³) of the present invention made using metallocene catalyst in a gas phase polymerization process and comprising 2.8% EXCEED™-Master Batch- 1 and 1.15% EXCEED™-Master Batch-2 which supplied about 2300 ppm antiblock (Talc; ABT-2500) and about 1400 ppm slip for the entire film. Sample C5 comprised a three-layer film having skins comprising an ethylene vinyl acetate copolymer (0.9269 g/cm³) having 5.6 wt. % vinyl acetate comonomer content and containing 2300 ppm antiblock (diatomaceous earth) and 1400 ppm slip. Film properties are summarized in Table XXIV. Comparative examples of Samples A5 and C5 are denoted in the table by an asterisk (*).

At the same nominal additive loading, the formulated Sample B5 comprising VLDPE skin layers of the present invention film had similar or slightly better optical and reblock (COF may be slightly deficient) properties than Sample C5 comprising ethylene vinyl acetate skin layers.

TABLE XXIV

Comparison of Formulated mPE to EVA

| | Sample | | |
|---|---|---|---|
| | A5* | B5 | C5* |
| Core Layer | NTX-107 | NTX-107 | NTX-107 |
| Skin Layer | | | |
| Resin | Exceed 350D60 | ECD-321 | LD306.58 |
| ECD MB-4 | 2.8% | 2.8% | — |
| ECD MB-2 | 1.15% | 1.15% | — |
| Actual Gauge, mils | 1.79 | 1.81 | 1.80 |
| Haze, % | 8.4 | 6.0 | 7.0 |
| Gloss, 45 deg | 72 | 80 | 73 |
| Reblock, g | 6 | 28 | 56 |
| COF, kinetic (in/in) | 0.09 | 0.12 | 0.11 |
| COF, static (in/in) | 0.11 | 0.16 | 0.14 |

In use as a skin layer, VLDPEs of the present invention are fully competitive with, if not superior to ethylene vinyl acetate copolymers having a vinyl acetate content of up to 9 wt %. VLDPEs generally have superior physical properties, similar optical properties, and lower optimum hot tacking temperatures than ethylene vinyl acetate used as a skin layer.

Example 14

Peel tests were conducted to determine the adhesion of the 50 g/m² coatings to the OPP/aluminum substrate (polyethylene coatings on the OPP side of the substrate). Fifteen (15) mm wide specimens were cut in the machine direction of the samples. The polyethylene coating was peeled manually from the substrate to allow the coating and substrate to be clamped into opposing grips on a tensile tester. The grips are separated at a rate of 100 mm/minute and the force to delaminate is measured. Table XXI shows the results of the peel test. Only the LDPE (ExxonMobil LD200, melt index 7.5 dg/min, 0.915 g/cm³), LLDPE (Dow 3010, melt index 5.4 dg/min, density 0.921 g/cm³), and EVA (ExxonMobil LD261) samples could be peeled from the OPP. The other resins could not be peeled without tearing the substrate or causing delamination between the OPP and aluminum layers. The single-site catalyzed resins, inventive m-VLDPE (EXCEED™, ECD-330, melt index 12 dg/min, 0.912 g/cm³), plastomer (EXACT® 3040, melt index 16.5 dg/min, density 0.900 g/cm³) and plastomer (Affinity PT1450, melt index 7.5 dg/min, density 0.902 g/cm³) all had better adhesion to the OPP than the conventional LDPE, LLDPE, or EVA. It is interesting to note that LLDPE (Nova Sclair 61C, melt index 5.3 dg/min, 0.919 g/cm³) also had good adhesion to the OPP. One possible explanation is excessive oxidation in the Nova product due to very high extrusion temperatures, 332° C., which could have resulted in good adhesion.

TABLE XXV

|  | Peel Results (N/15 mm) |
|---|---|
| m-VLDPE (ECD-330) | not measurable |
| LDPE (Exxon Mobil LD200) | 0.40 (1 sample, all others pulled apart easily) |
| LLDPE (Dow 3010) | 0.47 (average of 4 samples) |
| LEVA (Exxon Mobil LD261) | 0.06 (average of 4 samples) |
| Plastomer (Exxxon Mobil Exact 3040) | not measurable |
| Plastomer) Dow Affinity PT1450. | not measurable |
| LLDPE (Nova Sclair 61C LLDPE) | not measurable |

All patents, test procedures, and other documents cited herein, including priority documents, are fully incorporated by reference to the extent such disclosure is not inconsistent with this invention and for all jurisdictions in which such incorporation is permitted.

While the foregoing discussion is directed to certain examples, versions and preferred embodiments of the present invention, other and further embodiments of the invention may be devised without departing from the basic scope thereof, and the scope of each invention disclosed herein is determined by the claims that follow, including their equivalents.

What is claimed is:

1. A polymer composition, comprising a copolymer derived from ethylene and one or more $C_3$–$C_{20}$ alpha olefin comonomers, said copolymer having:
   a) a comnonomer content of from 5 to 15 wt. %,
   b) a density of less than 0.916 g/cm³,
   c) a composition distribution breadth index in the range of from 55% to 70%,
   d) a molecular weight distribution Mw/Mn of from 2 to 3,
   e) a moleculat weight distribution Mz/Mw of less than 2, and
   f) a bi-modal composition distribution.

2. A monolayer film, comprising a copolymer derived from ethylene and one or more $C_3$–$C_{20}$ alpha olefin comonomers, said copolymer having:
   a) a comonomer content of from 5 to 15 wt. %,
   b) a density of less than 0.916 g/cm³,
   c) a composition distribution breadth index in the range of from 55% to 70%,
   d) a molecular weight distribution Mw/Mn of from 2 to 3,
   e) a molecular weight distribution Mz/Mw of less than 2, and
   f) a bi-modal composition distribution.

3. A multilayer film, comprising a first layer and a second layer, at least one of the layers comprising a copolymer derived from ethylene and one or more $C_3$–$C_{20}$ alpha olefin comonomers, said copolymer having:
   a) a comonomer content of from 5 to 15 wt. %,
   b) a density of less than 0.916 g/cm³,
   c) a composition distribution breadth index in the range of from 55% to 70%,
   d) a molecular weight distribution Mw/Mn of from 2 to 3,
   e) a molecular weight distribution Mz/Mw of less than 2, and
   f) a bi-modal composition distribution.

4. An article, comprising a substrate and a film disposed on the substrate, the film comprising a copolymer derived from ethylene and one or more $C_3$–$C_{20}$ alpha olefin comonomers, said copolymer having:
   a) a comonomer content of from 5 to 15 wt. %,
   b) a density of less than 0.916 g/cm³,
   c) a composition distribution breadth index in the range of from 55% to 70%,
   d) a molecular weight distribution Mw/Mn of from 2 to 3,
   e) a molecular weight distribution Mz/Mw of less than 2; and
   f) a bi-modal composition distribution.

5. The polymer composition, the monolayer film, or the multi-layer film of claim 1, 2, 3, or 4, wherein the copolymer is produced using an unbridged bis-Cp metallocene catalyst system.

6. The polymer composition, the monolayer film, the multi-layer film, or the article of claim 1, 2, 3, or 4, wherein the copolymer is produced in a gas phase polymerization process.

7. The polymer composition, the monolayer film, the multi-layer film, or the article of claim 1, 2, 3, or 4, wherein the copolymer is produced in a gas phase polymerization process at a pressure in the range of from 100 psig to 1000 psig.

8. The polymer composition, the monolayer film, the multi-layer film, or the article of claim 1, 2, 3, or 4, wherein the copolymer is produced using an unbridged bis-Cp metallocene catalyst system in a gas phase polymerization process at a pressure in the range of from 100 psig to 1000 psig.

9. The polymer composition, the monolayer film, or the multi-layer film of claim 1, 2, or 3, wherein the copolymer has a melt index of 5 g/10 minutes or less.

10. The polymer blend composition or the article of claim 1 or 4, wherein the copolymer has a melt index of 5 g/10 minutes or more.

11. A polymer composition, comprising a metallocene-catalyzed linear VLDPE polymer, the VLDPE polymer having:
   (a) a density of less than 0.916 g/cm³,
   (b) a composition distribution breadth index of 50 to 85% by weight,
   (c) a molecular weight distribution Mw/Mn of 2.0 to 3.0,
   (d) a molecular weight distribution Mz/Mw of less than 2.0, and
   (e) two peaks in a TREF measurement.

12. A monolayer film comprising a polymer composition including a metallocene-catalyzed linear VLDPE polymer, the VLDPE polymer having:

(a) a density of less than 0.916 g/cm$^3$,
(b) a composition distribution breadth index of 50 to 85% by weight,
(c) a molecular weight distribution Mw/Mn of 2.0 to 3.0,
(d) a molecular weight distribution Mz/Mw of less than 2.0, and
(e) two peaks in a TREF measurement.

13. A multilayer film, comprising a first layer and a second layer, at least one of the layers comprising a metallocene-catalyzed linear VLDPE polymer, the VLDPE polymer having:
(a) a density of less than 0.916 g/cm$^3$,
(b) a composition distribution breadth index of 50 to 85% by weight,
(c) a molecular weight distribution Mw/Mn of 2.0 to 3.0,
(d) a molecular weight distribution Mz/Mw of less than 2.0, and
(e) two peaks in a TREF measurement.

14. An article, comprising a substrate and a film disposed on the substrate, the film comprising a metallocene-catalyzed linear VLDPE polymer, the VLDPE polymer having:
(a) a density of less than 0.916 g/cm$^3$,
(b) a composition distribution breadth index of 50 to 85% by weight,
(c) a molecular weight distribution Mw/Mn of 2.0 to 3.0,
(d) a molecular weight distribution Mz/Mw of less than 2.0, and
e) two peaks in a TREF measurement.

15. The polymer composition, the monolayer film, the multilayer film, or the article of claim 11,12,13, or 14, wherein the VLDPE polymer is a gas-phase metallocene produced VLDPE polymer.

16. The polymer composition, the monolayer film, the multilayer film, or the article of claim 11, 12, 13, or 14, wherein the VLDPE polymer has a density of from 0.900 to 0.915 g/cm$^3$.

17. The polymer composition, the monolayer film, the multilayer film, or the article of claim 11, 12, 13, or 14, wherein the VLDPE polymer has a density of from 0.905 to 0.915 g/cm$^3$.

18. The polymer composition, the monolayer film, the multilayer film, or the article of claim 11, 12, 13, or 14, wherein the VLDPE polymer has a density of from 0.910 to 0.915 g/cm$^3$.

19. The polymer composition, the monolayer film, the multilayer film, or the article of claim 11, 12, 13, or 14, wherein the VLDPE polymer has a melt index of from 0.5 to 20 g/10 min.

20. The polymer composition, the monolayer film, the multilayer film, or the article of claim 11, 12, 13, or 14, wherein the VLDPE polymer has a melt index of from 0.5 to 10 g/10 min.

21. The polymer composition, the monolayer film, or the multilayer film of claim 11, 12, or 13, wherein the VLDPE polymer has a melt index of from 0.7 to 5 g/10 min.

22. The polymer composition, the monolayer film, the multilayer film, or the article of claim 11, 12, 13, or 14, wherein the VLDPE polymer is a comonomer of ethylene and at least one comonomer selected from the group consisting of C$_3$ to C$_{12}$ alpha olefins.

23. The polymer composition, the monolayer film, the multilayer film, or the article of claim 11, 12, 13, or 14, wherein the VLDPE polymer is a comonomer of ethylene and at least one comonomer selected from the group consisting of 1-butene, 1-hexene and 1-octene.

24. The polymer composition, the monolayer film, the multilayer film, or the article of claim 11, 12, 13, or 14, wherein the VLDPE polymer is a comonomer of ethylene and 1-hexene.

25. The polymer composition, the monolayer film, the multilayer film, or the article of claim 11, 12, 13, or 14, wherein the VLDPE polymer is a gas-phase metallocene-produced copolymer of ethylene and at least one C$_3$ to C$_{12}$ alpha olefin, and the VLDPE polymer has a density of from 0.900 to 0.915 g/cm$^3$ and a melt index of from 0.5 to 10 g/10 min.

26. The polymer composition, the monolayer film, the multilayer film, or the article of claim 11, 12, 13, or 14, wherein the VLDPE polymer has a composition distribution breadth index of 60 to 80% by weight.

27. The polymer composition, the monolayer film, the multilayer film, or the article of claim 11, 12, 13, or 14, wherein the VLDPE polymer has a composition distribution breadth index of 55 to 75% by weight.

28. The polymer composition, the monolayer film, the multilayer film, or the article of claim 11, 12, 13, or 14, wherein the VLDPE polymer has a molecular weight distribution Mw/Mn of 2.2 to 2.8.

29. The polymer composition, the monolayer film, the multilayer film, or the article of claim 11, 12, 13, or 14, wherein the VLDPE polymer has two or more melting point peaks as determined by differential scanning calorimetry.

30. The polymer composition of claim 11, wherein the polymer is a blend comprising a VLDPE polymer and at least one polymer.

31. The monolayer film of claim 12, wherein the monolayer film is a cast film.

32. The monolayer film of claim 12, wherein the monolayer film is a blown film.

33. The monolayer film of claim 12, wherein the film has a Dart Drop value of 600 g/mil or above.

34. The monolayer film of claim 12, wherein the film has a Dart Drop value of 1,100 g/mil or above.

35. The monolayer film of claim 12, wherein the film has a peak Hot Tack Strength of 6 N/15 mm or above.

36. The monolayer film of claim 12, wherein the film has a peak Hot Tack Strength of 6.5 N/15 mm or above.

37. The monolayer film of claim 12, wherein the polymer composition is a blend further including at least one other polymer.

38. The multilayer film of claim 13, wherein the multilayer film is a cast film.

39. The multilayer film of claim 13, wherein the multilayer film is a blown film.

40. The multilayer film of claim 13, wherein the film has a Dart Drop value of 500 g/mil or above.

41. The multilayer film of claim 13, wherein the film has a Dart Drop value of 800 g/mil or above.

42. The multilayer film of claim 13, wherein the multilayer film comprises at least layers including a top layer, a bottom layer, and a middle layer.

43. The multilayer film of claim 42, wherein the top layer and the bottom layer each comprises the metallocene-catalyzed linear VLDPE polymer.

44. The multilayer film of claim 42, wherein the middle layer comprises a linear low density polyethylene.

45. The multilayer film of claim 13, wherein the VLDPE polymer forms part of a blended polymer composition.

46. The multilayer film of claim 13, wherein the multilayer film has a heat seal initiation temperature between 80° C. and 90° C.

47. The multilayer film of claim 13, wherein the multilayer film has a peak Hot Tack Strength of 9 N/15 mm or above.

48. The multilayer film of claim 13, wherein the multilayer film has a peak Hot Tack Strength of 10 N/15 mm or above.

49. The article of claim 14, wherein the film comprises a monolayer film.

50. The article of claim 14, wherein the film comprises a multilayer film.

51. The article of claim 14, wherein the film is coated on the substrate.

52. The article of claim 14, wherein the film is laminated to the substrate.

53. The article of claim 14, wherein the substrate is selected from the group consisting of glass, plastic, metal foil, and paper.

* * * * *